Aug. 23, 1966 D. VOLK 3,267,617

LENS GENERATING APPARATUS

Original Filed Aug. 22, 1962 12 Sheets-Sheet 1

INVENTOR.
DAVID VOLK
BY
Meyer, Baldwin, Doan & Egan
ATTORNEYS

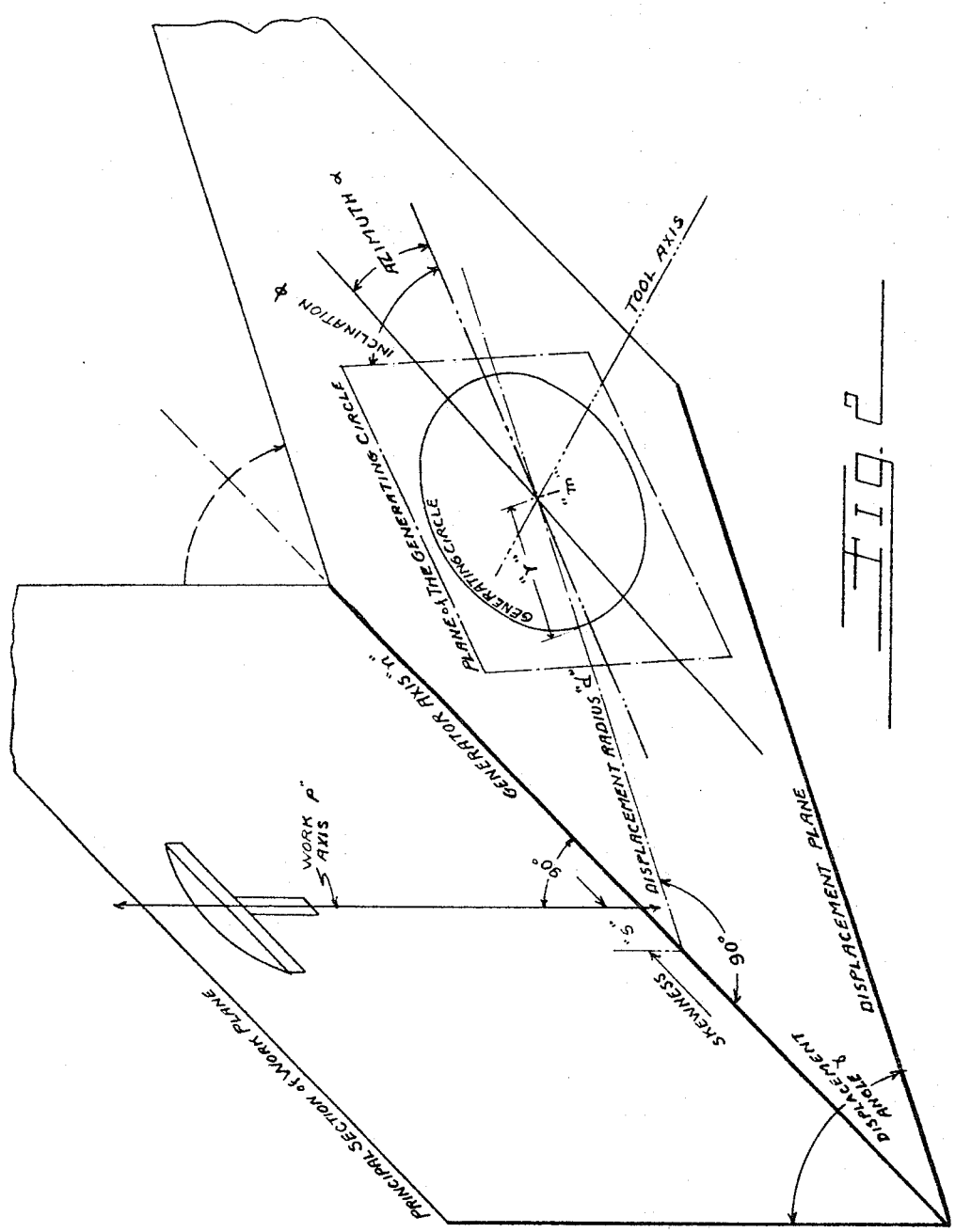

Aug. 23, 1966          D. VOLK          3,267,617

LENS GENERATING APPARATUS

Original Filed Aug. 22, 1962          12 Sheets-Sheet 3

INVENTOR.
DAVID VOLK
BY
Meyer, Baldwin, Doran & Egan
ATTORNEYS

Aug. 23, 1966  D. VOLK  3,267,617

LENS GENERATING APPARATUS

Original Filed Aug. 22, 1962  12 Sheets-Sheet 4

INVENTOR.
DAVID VOLK
BY
Meyer Baldwin Doran & Egan
ATTORNEYS

Aug. 23, 1966

D. VOLK 3,267,617

LENS GENERATING APPARATUS

Original Filed Aug. 22, 1962

INVENTOR.
DAVID VOLK
BY
Meyer, Baldwin, Doan & Egan
ATTORNEYS

Aug. 23, 1966  D. VOLK  3,267,617
LENS GENERATING APPARATUS
Original Filed Aug. 22, 1962  12 Sheets-Sheet 7

INVENTOR.
DAVID VOLK
BY
Meyer, Baldwin, Doran & Egan
ATTORNEYS

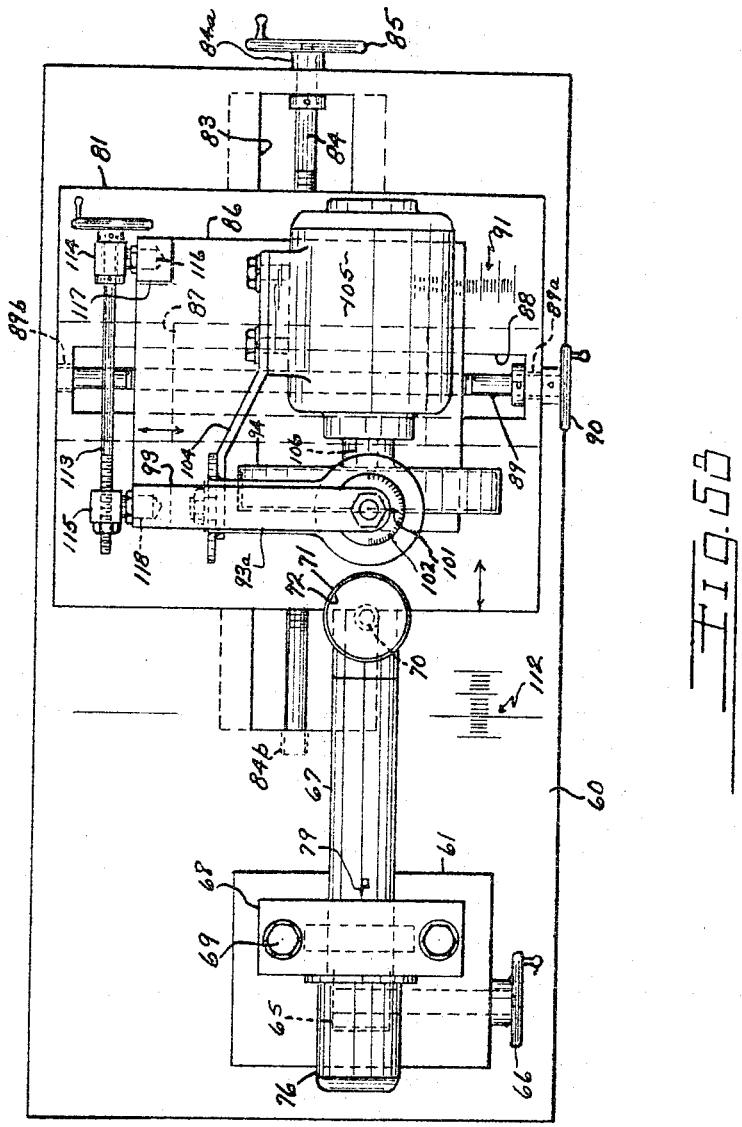

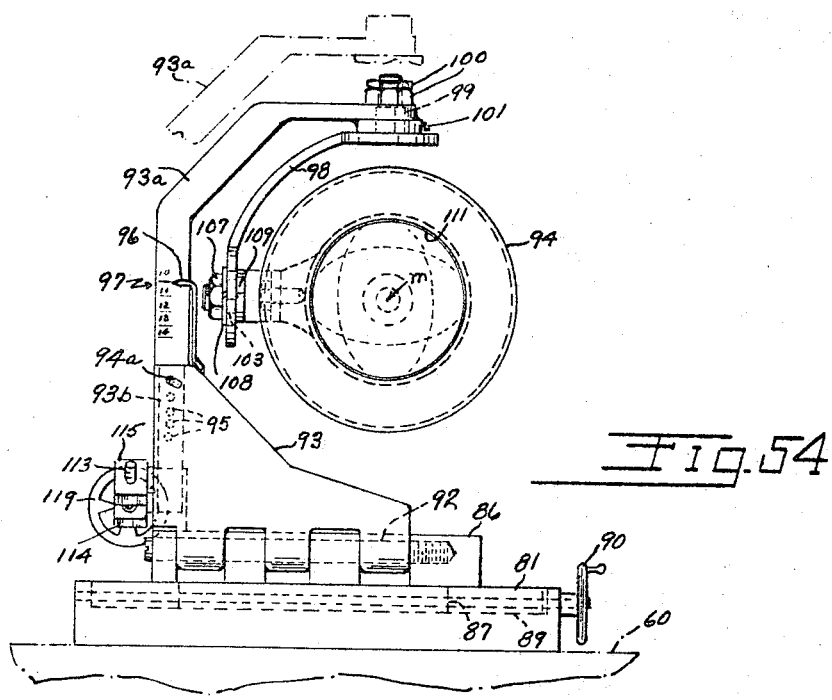
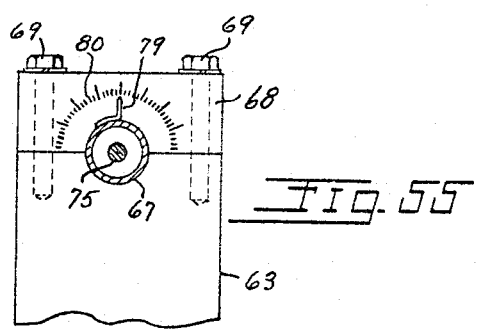

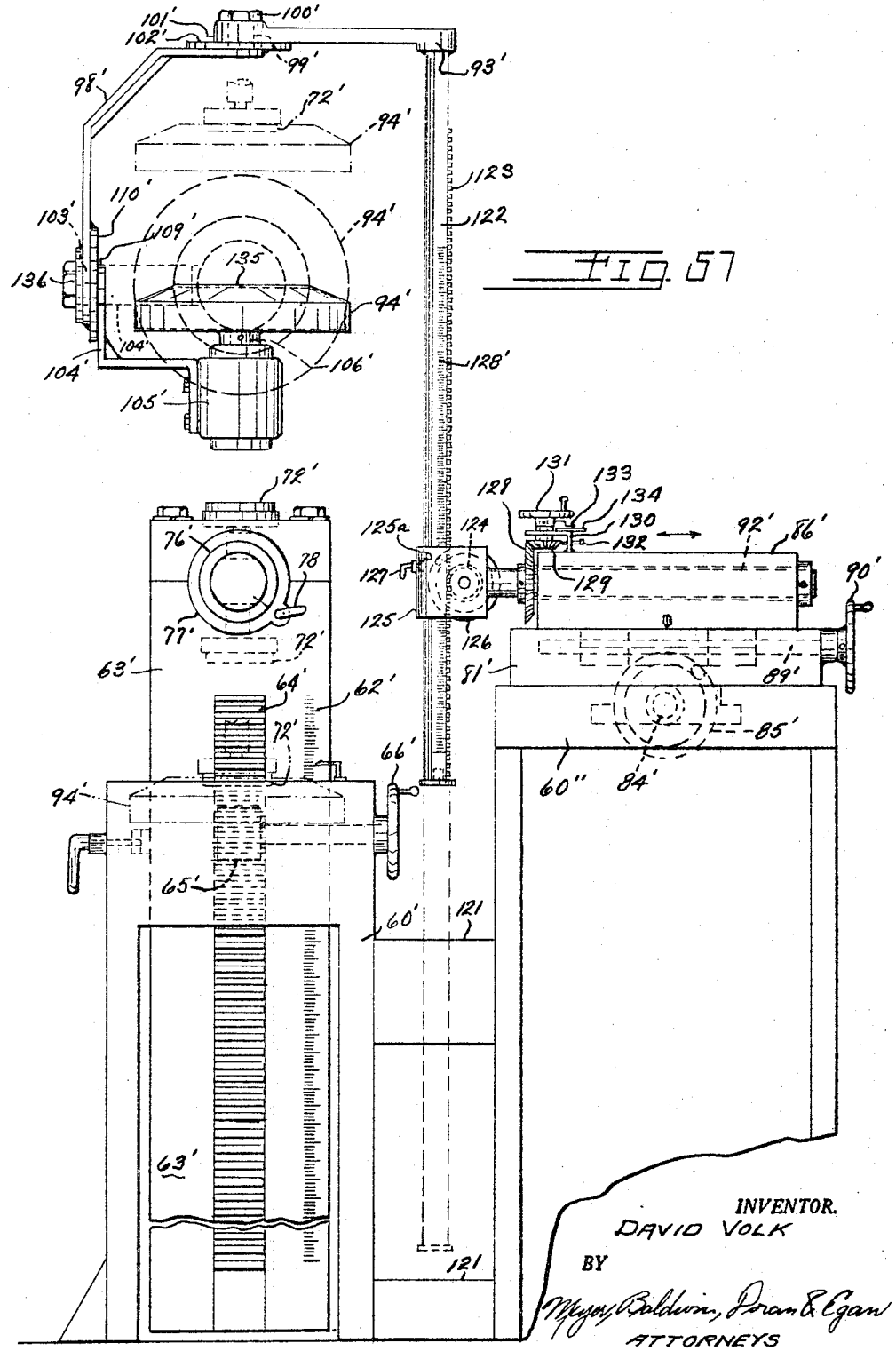

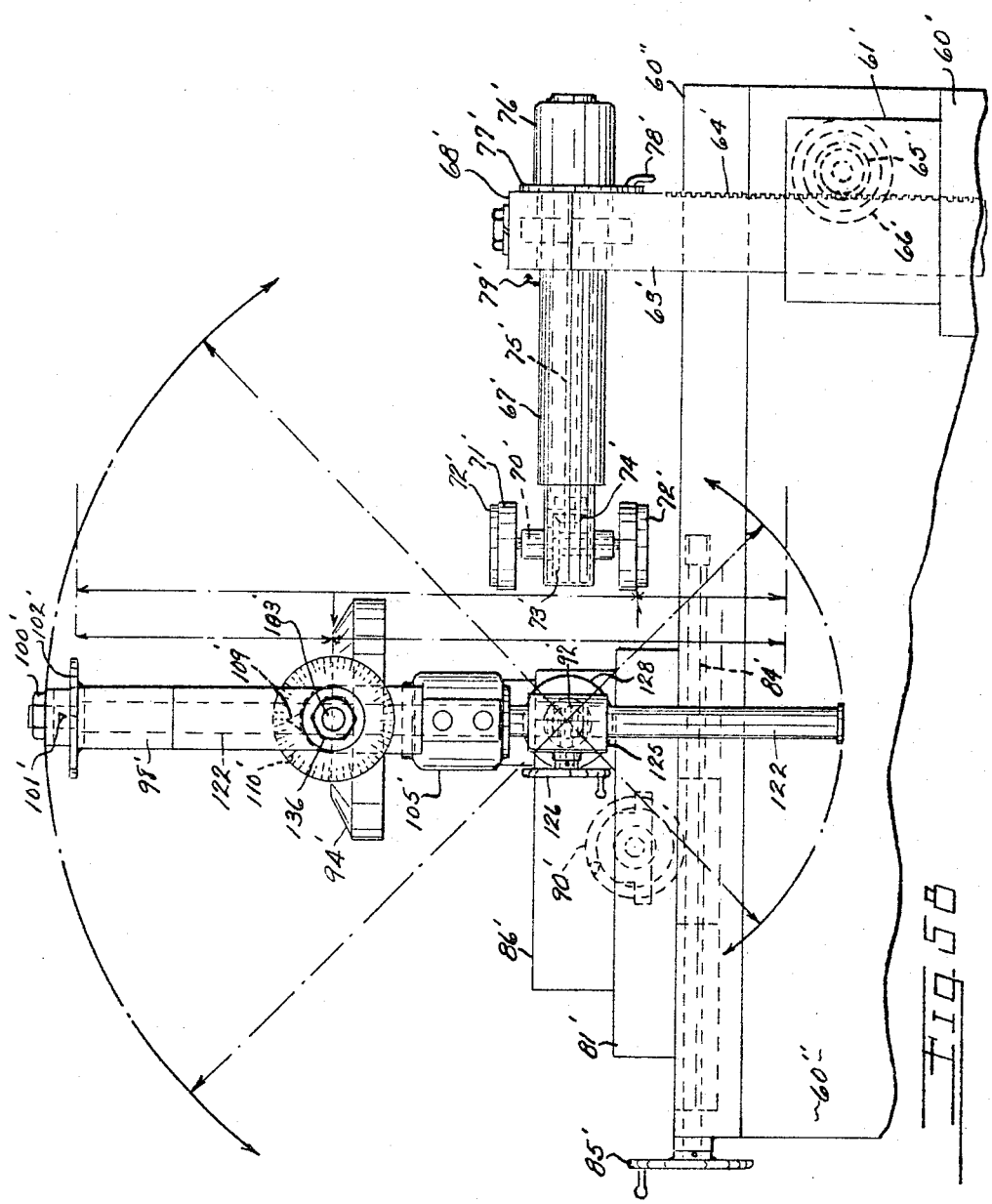

United States Patent Office 3,267,617
Patented August 23, 1966

3,267,617
LENS GENERATING APPARATUS
David Volk, 336 Kersdale Road, Pepper Pike, Ohio
Original application Aug. 22, 1962, Ser. No. 218,601, now Patent No. 3,218,765, dated Nov. 23, 1965. Divided and this application Aug. 18, 1965, Ser. No. 480,726
9 Claims. (Cl. 51—105)

This application is a division of my copending application Serial No. 218,601, filed August 22, 1962, now Patent No. 3,218,765 for Lens Generating Method.

This invention relates to an improved machine for generating on optical material or metal: aspheric surfaces of revolution which are cup-shaped with either an apical umbilical point or an apical cusp, aspheric surfaces of revolution which are cup-shaped with neither an apical umbilical point nor an apical cusp, and saddle-shaped surfaces of revolution with and without an apical cusp. The sphere, a special case of a surface of revolution with an apical umbilical point, and cup-shaped and saddle-shaped toric surfaces, with their principal meridians circular, can also be generated by the new method.

The novel machine of this invention performs the method which comprises in general the mounting of a work blank for rotation about a work axis, providing means for rotating this blank about its axis, providing a tool having a generally planar and generally circular material-removing edge, together with means for rotating this tool about its own tool axis perpendicular to the plane of the tool circular edge and concentric therewith, providing means for mounting this tool for movement about a generator axis at an angle to the work axis, these two axes determining a plane passing through a principal section of the surface of revolution generated, the tool being at a distance from the generator axis defined as a displacement radius of a length measured perpendicular to the generator axis to the center of the tool circular edge, and then moving said tool about the generator axis to at least penetrate the principal section while rotating the work blank and the tool about their respective axes.

The method of this invention is capable of producing by using the properties of a circular cup wheel in the generator and by circular or linear motions only:

(1) Cup-shaped surfaces of revolution with an apical umbilical point including prolate and oblate ellipsoid surfaces of revolution, and other surfaces resembling prolate and oblate ellipsoids, paraboloids, and hyperboloids of revolution, and which includes as a special case the sphere; and (2) Cup-shaped surfaces of revolution with an apical cusp which resemble the surfaces in (1) above, and which includes as a special case the spindle torus; and (3) Cup-shaped surfaces of revolution without an apical umbilical point or cusp, including elliptical toroids, in which one of the principal meridians is non-circular, having either a prolate or an oblate elliptical profile, and other cup-shaped surfaces resembling elliptical toroids; and (4) Saddle-shaped surfaces of revolution with and without an apical cusp, including elliptical toroids in which one of the principal meridians is non-circular, having either an oblate or a prolate elliptical profile, and other saddle-shaped surfaces resembling saddle-shaped elliptical toroids, and which include as a special case the saddle-shaped torus; and (5) Surfaces of revolution with an apical umbilical point whose meridian profiles have a point of inflection; and (6) Right circular cones; and (7) Elliptical cylinders; and (8) Templates to match the surfaces producible by this invention; and (9) Cams for generators which employ cam followers for the purpose of generating aspheric surfaces of revolution; and

(10) Tools and laps for use in generating or grinding surfaces by techniques other than the direct use of my improved generator.

In the drawings;

FIG. 2 is a diagrammatic perspective view illustrating the relative position of the tool and the work when practicing this invention;

Figure 32:
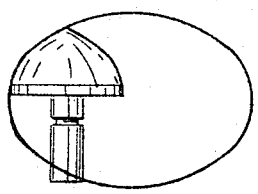
Figure 33:
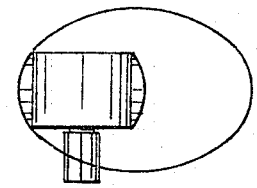
Figure 34:
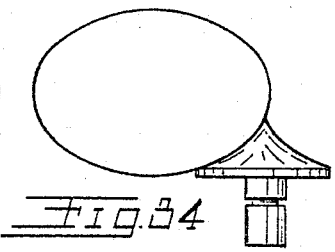
Figure 40:
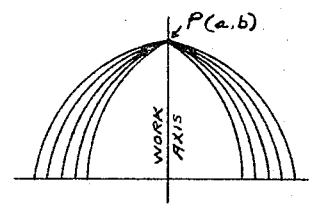
Figure 41:
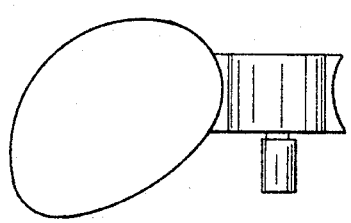
Figure 42:
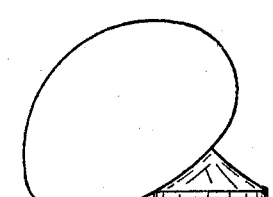
Figure 43:
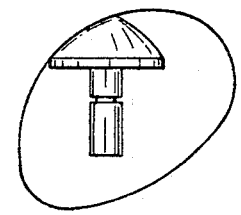
Figure 44:
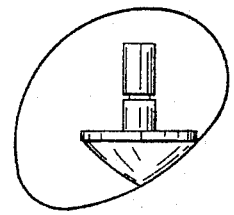
Figure 45:
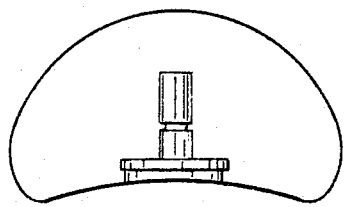
Figure 46:
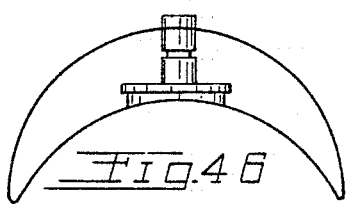
Figure 47:
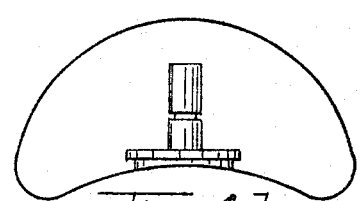
Figure 48:
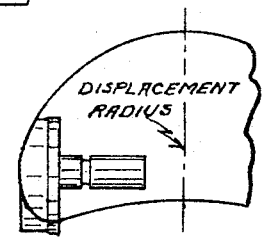
Figure 51:
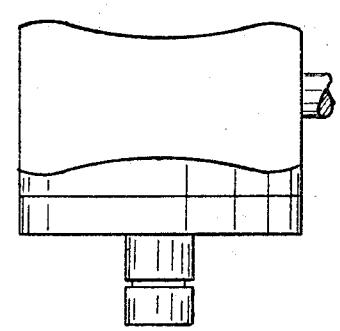
Figure 49:
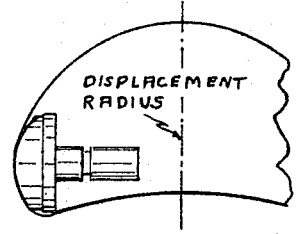
Figure 50:
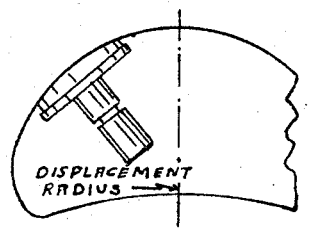
Figure 52:
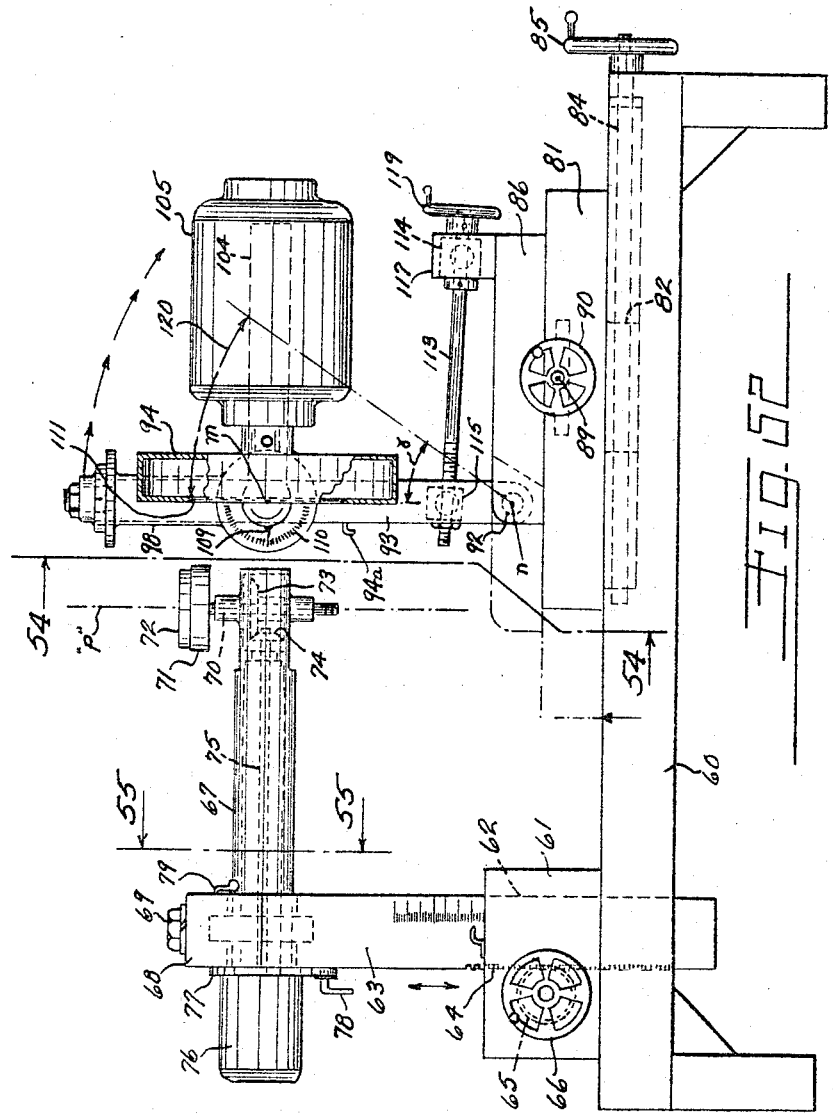
Figure 58:
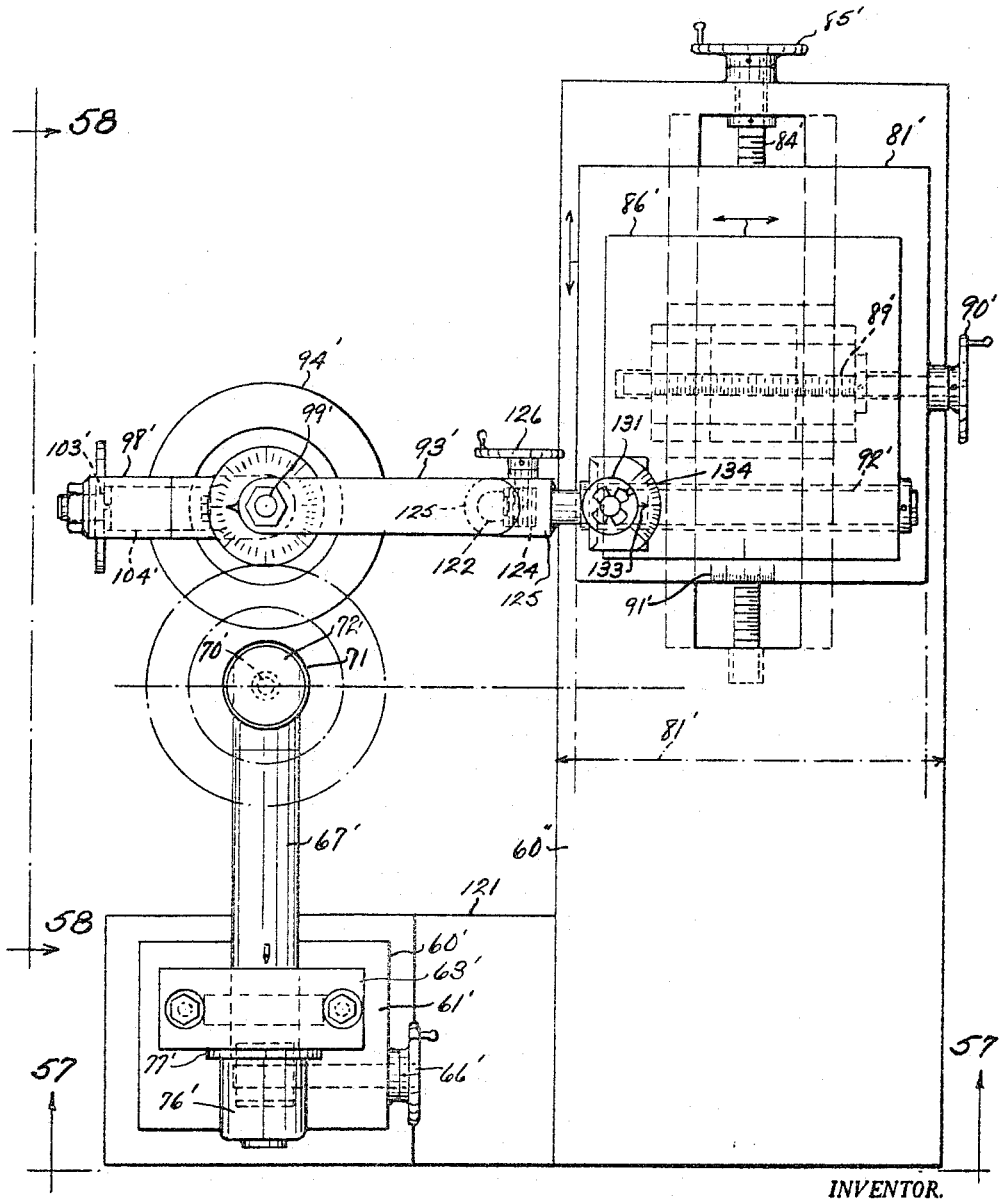

FIGS. 32 and 33 show traces in the principal sections generated by the concave edge of the generating tool when $d = \infty$, $\phi$ lies between 0° and 90°, $\alpha = 0°$ and $s$ lies between 0 and $r$;

FIG. 34 shows a trace in the principal section generated by the convex edge of the generating tool under the conditions corresponding to FIGS. 32 and 33;

FIGS. 35 to 39 show traces in principal section of revolutes generated according to this invention when $d = \infty$ and $\phi = 45°$;

FIG. 40 shows possible variations of the elliptical trace in the principal section made by simultaneously varying azimuth $\alpha$ and skewness $s$ while maintaining constant the point $P(a, b)$ where the trace intercepts the work axis;

FIGS. 41 and 44 show non-symmetrical traces in principal sections generated according to this invention where $d$ is a finite value, $\phi$ is between 0° and 90°, and $\alpha$ is between 0° and 90°;

FIGS. 45, 46 and 47 show traces in the principal sections of negatively curved revolutes generated according to this invention;

FIGS. 48, 49 and 50 show the traces in the principal sections of revolutes generated according to this invention with the work axis inclined at other than 90° to the generator axis;

FIG. 51 shows a trace in the principal section of a revolute generated according to this invention with the work axis parallel to the generator axis, the revolute then being used as a tool revolving about that same axis (shown horizontal) to form a piece of optical material rotating about its axis (shown vertical);

FIGS. 52, 53 and 54 are respectively a side elevation, top plan, and an end view on line 54—54 of a mechanism adapted for the practice of this invention;

FIG. 55 is a fragmental sectional view taken along the line 55—55 of FIG. 52; while FIGS. 56 and 57 are respectively a top plan view, end view and side elevational view of another mechanism adapted for the practice of this invention, FIGS. 57 and 58 being taken along respectively numbered lines in FIG. 56.

The term "generated," as used in this invention, means formed by means of the cutting or grinding edge of a circular cup wheel which maintains contact with optical material or metal, or work piece, as it revolves about its axis of revolution, in at least a point during the generating process.

Since all surfaces generated by the machine of this invention are surfaces of revolution and since the cup wheel used in the generating process is itself a surface of revolution, the surfaces generated will be herein called revolute surfaces or revolutes and the generator will be called the revolute generator.

Revolutes can be generated on glass, plastic, or other optical material, for subsequent fining and polishing, and then used directly as lens or mirror surfaces or for molding or casting such surfaces of plastic material. Revolutes can be used as one or both surfaces of non-ophthalmic and ophthalmic lenses, including contact lenses. Metal revolutes can be used for the purpose of molding or casting lenses of plastic material and can also be used as tools and laps for the purpose of generating or grinding revolutes, and can also serve as cams in point grinding machines which generate revolutes by a cam-following technique.

In order to simplify the description of this invention the circular cup wheel, or tool, can have its grinding edge practically reduced to a circular line. The tool may take various shapes as shown in FIGS. 1A to 1G. It will suffice henceforth to speak of this circular line as the generating circle. Further along in the description of this invention, the effects of utilizing a toric edge on the cup wheel will be taken into account.

The principle upon which this invention is based is that the trace of a circle moving through a plane can assume a variety of shapes which depend upon the orientation, or the change in orientation and position, of the circle with respect to the plane, as it passes through the plane. As an example, referring to FIG. 2, consider a line segment, hereafter called the displacement radius $d$, extending from the center $m$ of the said circle $c$ perpendicular to another line which serves as an axis, hereafter called the generator axis $n$, about which the circle can be rotated. The plane of the circle can be inclined in any manner with respect to the displacement radius, and the displacement radius, measured from the center of the circle to generator axis, can have any value (in this example, from $r$ to infinity where $r$ is the radius of the circle $c$). The said circle hereafter called the generating circle, as it rotates about the generator axis while maintaining a fixed position with respect to the displacement radius, delineates a geometrical solid in space. The outline of a section of the geometrical solid, produced by a plane containing the generator axis, hereafter called the principal section, is the trace of the generating circle passing through the principal section.

If the displacement radius is infinite, the generating circle moves linearly and in a direction normal to the principal section, and delineates an elliptical cylinder whose trace in the principal section is always an ellipse whose major axis can be oriented in any direction in the principal section, the direction depending upon the inclination of the plane of the generating circle with respect to the displacement radius, the limits of the ellipse being the circle and the line. If the displacement radius is finite, the trace in the principal section is never an ellipse (with one exception when it is a circle).

The trace of the generating circle in the principal section assume two types of shapes:

(1) Symmetrical shapes, with symmetry about the extension of the trace of the displacement radius in the principal section, which result when the displacement radius is continuous with a diameter of the generating circle, or when a diameter of the generating circle is parallel to the generator axis, the displacement radius not being continuous with a diameter of the generating circle, and (2) Non-symmetrical shapes, which result from all other orientations of the generating circle with respect to the displacement radius.

Let us first consider the ellipses which are obtained when the displacement radius is infinite. Since an infinite displacement radius is always parallel to the principal section, one need only consider the angle between the plane of the generating circle and the principal section to determine the shape of the elliptical trace in the principal section. The major axis of the ellipse is the line of intersection of the plane of the generating circle and the principal section through the center of the generating circle. The direction of the major axis is designated in degrees from 0 to 180, although for the purpose of this invention, 0° to 90° is all that is necessary. The 0° direction is perpendicular to the direction of the trace of the displacement radius in the principal section and the positive direction of the angle is counterclockwise.

The shape of an ellipse is defined by the eccentricity of the ellipse, where eccentricity, $e$, of the ellipse is given by the ratio of the interfocal distance of the major axis, or the ratio of one-half the interfocal distance to the semi-major axis. Consider the plane of a circle inclined at an angle $\phi$ with respect to a principal section. The trace of the circle as it traverses in a normal direction the principal section is an ellipse whose eccentricity is given by the equation:

$$e = \sin \phi \quad (1)$$

where $e$ varies from 0 to 1 as the inclination, $\phi$, varies from 0° to 90°. Along the ellipse the curvature changes continuously from the maximum at the ends of the major or transverse axis, the prolate point, to the minimum at the ends of the minor or conjugate axis, the oblate point. At any point $P(a, b)$, where $a$ is the coordinate in the direction of the semi-major axis, of length A, and $b$ is the coordinate in the direction of the semi-minor axis, of length B, the origin being the geometrical center of the ellipse, the radius of curvature is given by the equivalent expressions:

$$r_{p(a,b)} = \left(\frac{A^4 b^2 + B^4 a^2}{A^4 B^4}\right)^{\frac{3}{2}} \quad (2a)$$

$$r_{p(a,b)} = \left(\frac{b^2 + a^2 \cos^4 \phi}{A^2 \cos^4 \phi}\right)^{\frac{3}{2}} \quad (2b)$$

$$r_{p(a,b)} = \left(\frac{b^2 + a^2(1-e^2)^2}{B^2(1-e^2)}\right)^{\frac{3}{2}} \quad (2c)$$

where $B = A \cos \phi$. By setting $b=0$, the radius of curvature $r_{\text{prolate}}$, at the ends of the major axis, the prolate point, is obtained, and by setting $a=0$, the radius of curvature, $r_{\text{oblate}}$, at the ends of the minor axis, the oblate point, is obtained.

If the ellipse is rotated about the major axis, a prolate ellipsoid is swept out in space and if the ellipse is rotated about the minor axis, an oblate ellipsoid is swept out in space. The major axis, passing through the apices of the prolate ellipsoid, the prolate umbilical points, serves as the optic axis of the prolate ellipsoid. Either end of the prolate ellipsoid, surrounding an umbilical point of maximum curvature, can serve as an optical surface which is symmetric with respect to the optic axis.

The minor axis, passing through the apices of the oblate ellipsoid, the oblate umbilical points, serves as the optic axis of the oblate ellipsoid. Either end of the oblate ellipsoid surrounding the umbilical point of minimum curvature can serve as an optical surface which is symmetric with respect to the optic axis.

If the ellipse is rotated about any normal to its curve other than the major or minor axis, two dissimilar geometrical solids having a common umbilical point at one apex and a common cusp at the other will be swept out in space. If the ellipse is rotated about any axis passing through it which is not normal to its curve, two double cusped coaxial geometrical solids will be swept out in space.

Generation of revolute surfaces can be accomplished by impressing upon the optical material or metal, hereafter called work, as it revolves about its axis of revolution, the profile of some portion of the trace of the generating circle in the principal section. The generating circle, as has been stated, is obtained from the lip of a circular cup wheel. The cup wheel, hereafter called the tool, is attached to a power supply which is capable of revolving the tool rapidly about the tool axis $o$, the tool axis being perpendicular to the plane of the generating circle and passing through the center of the generating circle. The tools differ from the usual cup wheels, well known in the art of generating lenses, in that they usually make use of overhanging lips, to which abrasive material such as diamond dust is bonded. (See FIGS. 1A to 1G.)

In order to follow the description of the generation of revolute surfaces, certain lines, planes, angles, and motions, and their relative orientations, dimensions, and directions will be defined, although the actual orientation in space of the total generator is arbitrary.

A line lying in a vertical plane, serving as the axis of revolution about which the work revolves, is called the work axis $p$ (FIG. 2). A horizontal line intersecting or parallel to the work axis is called the generator axis $n$, and the vertical plane defined by the work axis and the generator axis is termed the principal section. In the description now to be given, the work axis shall be limited to the vertical direction although the invention includes all inclinations of the work axis with respect to the generator axis, including the special condition of parallelism, a limitation being that the work axis and the generator axis shall not coincide. A line segment perpendicular to the generator axis, extending to the center of the generating circle, is called the displacement radius and its length is symbolized by $d$. The radius of the the generating circle is symbolized by $r$. The displacement radius and the generator axis define a plane called the displacement plane. The angle between the principal section and the displacement plane, FIG. 2, which is varied smoothly during the generation of a single surface, is called the displacement angle, and it is symbolized by $\gamma$. The distance between the work axis and the displacement radius measured along the generator axis is called the skewness and is symbolized by $s$. The angle between the displacement plane and the plane containing the generating circle is called the inclination, the symbol for the inclination being $\phi$. The azimuth of the line of intersection of the displacement plane and the plane of the generating circle is given by the symbol $\alpha$ and it is measured in the displacement plane in a counterclockwise direction from the generator axis.

By proper combination of the above predetermined and adjustable variables, a variety of revolute surfaces with an apical umbilical point can be generated, including spheres, prolate and oblate ellipsoids, surfaces resembling prolate and oblate ellipsoids, paraboloids, and hyperboloids, and surfaces whose meridian section profiles have a point of inflection. By other combinations of the above predetermined and adjustable variables, surfaces with an apical cusp having profiles resembling sections of the aforementioned surfaces, can be generated. By still another combination of the above predetermined and adjustable variables cup-shaped surfaces of revolution without an apical umbilical point or cusp can be generated, and by still other combinations saddle-shaped surfaces of revolution, with and without apical cusps can be generated.

The term "generated" as used in this invention means formed by means of the cutting or grinding edge of a circular cup wheel which maintains contact with the work piece as it revolves about its axis of revolution, in at least a point during the generating process, the generated surface or surface portion being generally complementary to that portion of the cutting or grinding edge of the circular cup wheel producing the surface or surface portion while the magnitude of the curvature of the generated surface and that of the cutting or grinding edge of the cup wheel are unequal except in special cases, the sphere and a principal meridian of a toric surface.

In the process of generating revolute surfaces, the work which consists of a lens or mirror blank B of glass, plastic or other optical material, or metal, is mounted by means of pitch or other adhesive, or by mechanical means, to a lens blank holder H. Various forms of blanks and holders are shown in FIGS. 3A to 3G. The lens or mirror blank holder is then attached by taper or by screw thread to a revolving axle A, in such a way that there is a common axis of revolution, hereafter called the work axis $p$, for the axle, lens blank holder, and work. If the revolute surface is to be generated on metal, the lens blank or other optical material is replaced by the desired piece of metal of appropriate size, or the lens blank holder and work may be constructed of a solid piece of metal as in FIG. 3G. The work piece must overlay the work axis if the generated surface is to include an actual apical umbilical point or apical cusp.

The tool containing the generating circle revolves rapidly about the tool axis so that the circular generating line provides abrasive action along the line, point, or points of contact with the revolving work, the said contact being either in a line, point, or points depending upon the surface to be generated and the stage of generation. As the work revolves about the work axis, the tool, revolving about the tool axis, moves in an arcuate motion about the generator axis which lies below the level of the center of the generating circle, or in a linear motion if the displacement radius is infinite so that the generating circle of the tool traversing partially or completely the principal section removes material from the work during its motion. The trace of the generating circle in the principal section provides the profile of the revolute surface.

The advantage of this type of generation over other types of point grinding generators is that the orientation and motion of the generating circle can be used directly in the formation of the revolute surface without the necessity of using cams to control the curvature of the surface as in other types of point grinding generators which require cams and cam followers. The fact that in this improved revolute generator the curvatures of the generating circle and the work are generally complementary at their point or points of contact tends to improve the quality of the generated surface, since mechanical vibration will tend only to extend the point or points of contact into a short line segment or segments of contact which immediately resists further effects of mechanical vibration, in contrast to other known point contact grinding generators in which the curvature of the tool and the work are of opposite sign, and not complementary, for the generating of convex surfaces, which therefore tend to gouge the work during mechanical vibration. Another advantage of the revolute generator is that all motions of the parts of the generator are either circular, or linear. The distinguishing feature of this revolute generator from known line contact generators which generate surfaces of revolution is the separation of the work axis from the generator axis in the revolute generator whereas in line contact generators, the work axis and the generator axis coincide. In the cam following type of generator for the purpose of generating aspheric surfaces of revolution, there is no generator axis, hence the necessity for a cam to control the motion of the tool.

Figure 3A:
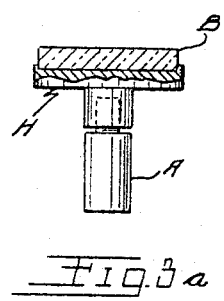
FIGS. 3A to 3G show diametrically located sectional views through various work blanks and blank holders, each blank being circular in plan view.
Figure 3B:
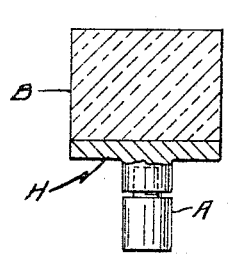
Figure 3C:
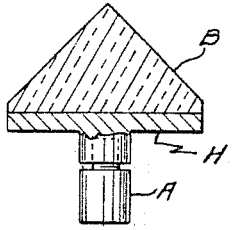
Figure 3E:
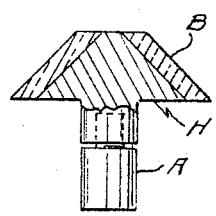
Figure 3F:
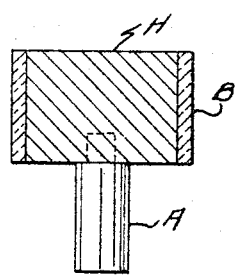
Figure 3D:
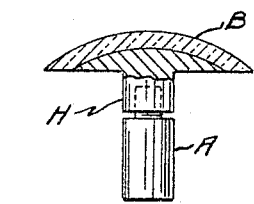
Figure 3G:
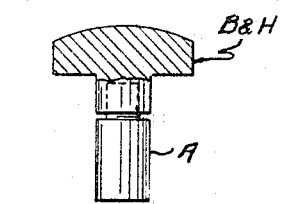

In order to understand the principles of this revolute generator, examples of the generation of revolute surfaces will be given. The work piece is to be of such a diameter, thickness, and curvature that the meridian profile of the actual surfaces generated will comprise only a portion of the total revolute profile depicted by the trace of the generating circle in the principal section. One example of such work piece is a flat circular ophthalmic lens blank of 60 mm. diameter and 10 mm. thickness (FIG. 3A). Another example of such a work piece is a cylinder of ophthalmic material or metal of 5 cm. inner radius and 5.5 cm. outer radius and of 7 cm. length, symmetrical with respect to the work axis (FIG. 3F). Still another example would be a zone of a sphere of ophthalmic material or metal, either solid, or hollow, in the form of a bowl with the radius of its outer and inner surfaces 7 cms. and 6 cms. respectively (FIG. 3D). Another example would be a right circular cone of ophthalmic material or metal of 5 cm. radius at its base and altitude of 5 cm. (FIG. 3C).

The simplest case of a revolute surface with an apical umbilical point is the sphere (the sphere being a special case since it is umbilical over the entire surface). The variables are adjusted as follows:

$s=0$
$d=\infty$
$\phi=0°$
$r=$ the radius of the generating circle = the radius of the spherical surface
$\alpha$ is not applicable since the generating circle lies in the displacement plane.

Figure 4:
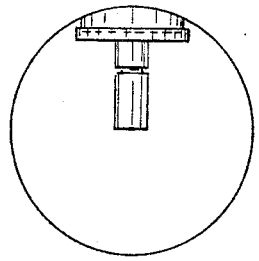
FIG. 4 is a sectional view of the principal section of a work blank ground to a spherical profile according to this invention.

With the work axis vertical and the surface to be generated facing upwards, and with the uppermost part of the generating circle of the tool at approximately the same distance from the generator axis as is the top of the work, the displacement angle is gradually reduced by a powered feeding mechanism, which in this case moves the generating circle in a direction normal to the principal section. While the work and the tool are rapidly revolving about their respective axes, the plane of the generating circle moves into the principal section, and the work takes on the profile of the trace of the generating circle in the principal section (FIG. 4). This is an exceptional case in which the generating circle at the completion of the generation makes an instantaneous line of contact over the entire work.

The same spherical surface can be generated with any other value of $d$ ranging from zero to infinity. When the displacement angle $\gamma$ reduces to zero, the plane of the generating circle contains the work axis, and the generating circle makes an instantaneous line of contact with the work. If $d$ is some negative value ranging from zero to $-r$, a sphere can be generated whose radius of curvature will be $d$, but point contact only will be made along the profile of the generated surface of the sphere, although the signs of the curvature of the generating circle and the surface of the sphere will be generally complementary.

Figure 5:
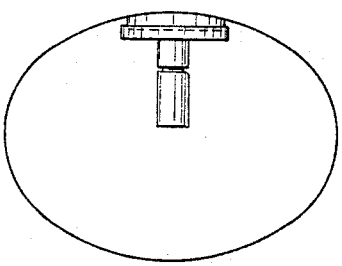
FIG. 5 is a view of the principal section of a work blank ground to the profile of an oblate ellipsoid.

Now consider the generation of the oblate ellipsoid (FIG. 5). The variables are adjusted as follows:

$s=0$
$d=\infty$
$\phi=$ arc sin $e$, where $e$ is the desired eccentricity of the ellipsoid
$r=r_{\text{oblate}}(1-e)^{1/2}$ where $r_{\text{oblate}}$ is the desired radius of curvature at the oblate umbilical point
$\alpha=0°$ With the work axis vertical and the surface to be generated facing upwards, and with the uppermost part of the inclined cup wheel set at about the level of the top of the work, the displacement angle is gradually reduced by a powered feeding mechanism, which in this case moves the generating circle in a direction normal to the principal section. While the work and tool are rapidly revolving about their respective axes, the displacement angle is gradually reduced until the contacting edge of the inclined cup wheel encounters the work in a point towards the top of the work and with further decrease in the displacement angle the point lengthens into two lines of contact symmetrically placed with respect to the work axis. With continued decrease in the displacement angle the lines of contact reduce to two points of contact symmetrically placed at the outer limit of the work piece. These two points and the work axis lie in the principal section. Reversing the direction of the change in the displacement angle allows the tool to make contact with the work in two moving points which always lie in the principal section, which are symmetric with respect to the work axis, and which gradually move towards the apex of the generated work piece to meet in a single point, the oblate umbilical point, at the apex of the work. The tool is then withdrawn from the work piece by continuing its motion in the same direction. The surface generated is an exact oblate ellipsoid, the eccentricity of the ellipsoid and the radius of curvature at the apex being functions of $\phi$, and $\phi$ and $r$ respectively.

For the generation of the prolate ellipsoid (FIG. 6), the variables are adjusted as follows:

$s=0$ $d=\infty$ $\phi=$ arc sin $e$, where $e$ is the desired eccentricity of the ellipsoid $r=\dfrac{r_{\text{prolate}}}{1-e^2}$ where $r_{\text{prolate}}$ is the desired radius of curvature at the prolate umbilical point $\alpha=90°$ With the work axis vertical and the surface to be generated facing upwards, and with the uppermost part of the inclined cup wheel set at about the level of the top of the work, the displacement angle is gradually reduced by a powered feeding mechanism, which in this case moves the generating circle in a direction normal to the principal section. While the work and the tool are rapidly revolving about their respective axes, the displacement angle is gradually reduced until the contacting edge of the inclined cup wheel encounters the periphery of the work in a point which gradually lengthens into a line as the displacement angle continues to decrease. With further reduction of the displacement angle the length of the line of contact reduces to a point, the umbilical point, at the apex of the work, the displacement angle being zero at this time. Reversing the direction of change of the displacement angle allows the tool to make contact with the work in only a single moving point which always lies in the principal section, until finally the tool is withdrawn from contact with the work. The surface generated is an exact prolate ellipsoid, the eccentricity of the ellipsoid and the radius of curvature at the apex being functions of $\phi$, and $\phi$ and $r$ respectively.

In the last two of the three examples just given, the generation of the prolate and the oblate ellipsoids, $d=\infty$, and the tool moves linearly in a direction normal to the principal section. If $d$ is finite, and with $s=0$, then a changing displacement angle results in each point on the generating circle moving in a circular arc about the generator axis. As a consequence, the plane of the generating circle is continually changing its inclination with respect to the principal section, and the generating circle itself has both horizontal (towards the principal section) and vertical components of motion. The result is that the trace of the generating circle in the principal section produces a closed curve, symmetrical about the work axis, which cannot be an ellipse, but assumes a variety of shapes depending upon the values of $d$, $r$, $\phi$, and $\alpha$.

In particular, if $s=0$, $\alpha=0°$ or $90°$, and $r$ sec $\phi \leq d < \infty$ when $\alpha=0°$, and $r$ cos$^2$ $\phi \leq d < \infty$ when $\alpha=90°$, the traces will be symmetric about the work axis, having oval or spherical shapes, and within the above limits for $d$, the sense of the curvature will be the same at all points on the trace, that is, there will be no points of inflection. The revolutes corresponding to these traces will be called modified ellipsoids.

Modified ellipsoids, as defined in this invention, are those symmetrical revolutes with apical umbilical points, with curvatures all of one sense, whose meridian profiles are represented by oval traces of the generating circle in the principal section.

Figure 7:
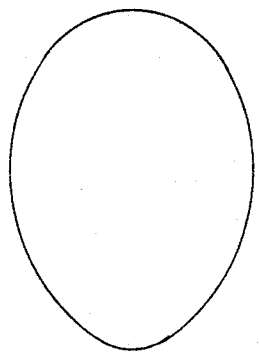
FIG. 7 is a view of a trace in the principal section of an egg-shaped modified ellipsoid when the azimuth is 90°.

Consider those modified ellipsoids form when $\alpha=90°$, that is, those symmetrical revolutes having an apical umbilical point, produced when the displacement radius is continuous with the diameter of the generating circle of radius $r$. With a given value for $\phi$, and $d \gg r$, the traces of the generating circle in the principal section is an egg-shaped oval modified elliptical trace (FIG. 7) which has a "major axis" coinciding with the trade of the displacement radius in the principal section, analogous to the major axis of an ellipse, and a "minor axis" normal to but not bisecting the "major axis," analogous to the minor axis of an ellipse. There is thus symmetry about the "major axis," but not about the "minor axis" of this modified ellipse. In effect, this egg-shaped or prolate oval modified ellipse has the appearance of two semi-prolate ellipses of continuous but unequal semi-major axes, joined at a common minor axis. Each half of this modified ellipse, as divided at the common "minor axis" resembles a semi-ellipse, and, there are osculating ellipsoids which will appear to match over a large area each of the apices of the revolute surfaces having the meridian section of the prolate oval modified ellipsoid.

Figure 8:
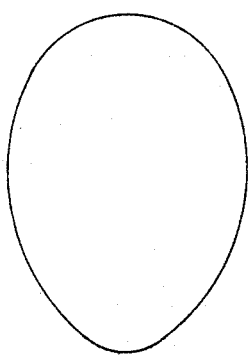
FIG. 8 is a view of a trace in the principal section of a modified ellipsoid having the appearance of a semi-prolate ellipse joined smoothly at a common "minor axis" to a trace having the appearance of a parabola.
Figure 9:
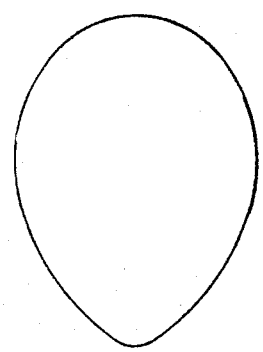
FIG. 9 shows a trace in the principal section of a modified ellipsoid which has the appearance of a semi-prolate ellipse joined smoothly at a common "minor axis" to a portion of a trace having the appearance of a hyperbola.

As $d$ is gradually reduced from infinity, the asymmetry of the modified ellipsoid with respect to its "minor axis" becomes exaggerated so that as $d$ approaches $r$, the trace of the generating circle in the principal section develops at one stage, the appearance of a semi-prolate ellipse joined smoothly at the common "minor axis" to a parabola (FIG. 8), and then with further decrease in $d$ to a hyperbola (FIG. 9). Osculating ellipsoids, paraboloids and hyperboloids will appear to match over a large area each of the apices of the surfaces having the meridian sections of this prolate modified ellipsoid.

Figure 10:
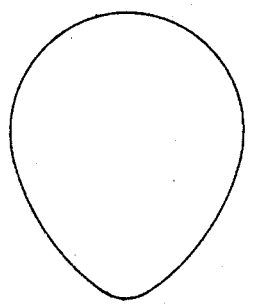
FIG. 10 shows a trace in the principal section of a modified ellipsoid where the displacement radius is between $r$ and $r \cos \phi$ and having the appearance of an ellipse joined to a hyperbola.
Figure 11:
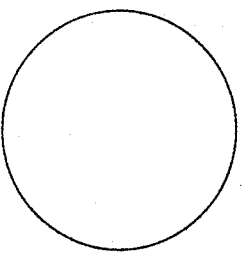
FIG. 11 shows a spherical trace in the principal section generated when the displacement radius is $r \cos \phi$.

As $d$ is reduced from $r$ to $r$ cos $\phi$, the modified elliptical trace (produced by a 180° rotation of the generating circle about the generator axis) takes the form first of an ellipse joined to a hyperbola (FIG. 10), then as $d$ is reduced, to a parabola, then takes the form of two prolate ellipses joined at a common minor axis, and at $d=r$ cos $\phi$, the trace is a circle of radius $r$ cos $\phi$ (FIG. 11). Thus when $d=r$ cos $\phi$, a series of spherical surfaces can be generated from one size cutting wheel.

Figure 12:
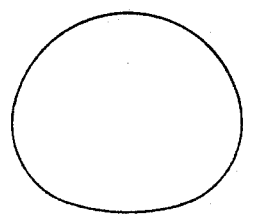
FIG. 12 shows a trace in the principal section generated when $r \cos \phi > d \geq r \cos^2 \phi$, and having the appearance of a semiprolate ellipse with its major axis continuous with the minor axis of a semi-oblate ellipse.

For $r$ cos $\phi > d \geq r$ cos$^2$ $\phi$, the trace of the generating circle in the principal section has the appearance of a semi-prolate ellipse (FIG. 12) with its major axis continuous with the minor axis of a semi-oblate ellipse, there being a common "major-minor axis" joining the two ellipses.

Figure 13:
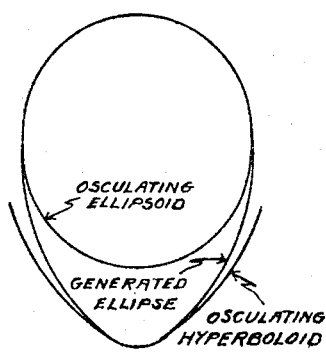
FIG. 13 illustrates the approximate matching of a trace in the principal section of a modified prolate ellipsoid generated by this invention on a hyperbola at one end, and on an ellipse at the other end.

Osculating ellipsoids, sphere and hyperboloids will appear to match over a large area each of the apices of the surfaces having the meridian sections of these prolate oval modified ellipsoids. FIG. 13 shows the approximate matching of one portion of a trace of a modified prolate ellipsoid, generated by this invention, on a hyperbola, and the matching of another portion thereof on an ellipse.

Figure 14:
FIG. 14 shows a trace in the principal section generated with $r \cos^2 \phi > d > 0$ and having the appearance of a semi-prolate ellipse joined smoothly to a curved section having a point of inflection.

For $r$ cos$^2$ $\phi > d > 0$, the trace of the generating circle in the principal section has the appearance of a semi-prolate ellipse joined smoothly to a curved section of the trace having a point of inflection (FIG. 14). Depending upon whether the surfaces to be generated faces up or down, revolutes with profiles of either of the portions of the trace of the generating circle can be generated. At $d=0$, the two portions of the trace of the generating circle, just described, merge into a circular arc. The revolute generated when $d=0$ is a sphere of radius $r$.

Figure 15:
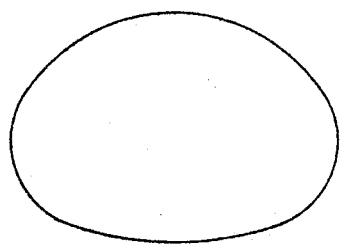
FIG. 15 shows a trace in the principal section generated when $0° < \phi < 90°$ and $\infty > d \geq r \cos \phi$, and having the appearance of two semi-oblate ellipses having a common "major axis" of length $2r$ and having "semi-minor axes" of different lengths.

Consider now those modified ellipsoids formed when $\alpha=0°$, that is, when a diameter of the generating circle, of radius $r$, is parallel to the generator axis, the displacement radius intersecting but not being continuous with a diameter of the generating circle. With $0° < \phi < 90°$, $\infty > d \geq r$ sec $\phi$, the trace of the generating circle in the principal section will have the appearance of two semi-oblate ellipses having a common "major" axis, of length $2r$, with each semi-oblate ellipse having a "semi minor" axis of different length (FIG. 15). The trace of this oblate oval modified ellipse will, therefore, be symmetric about its "minor" axis, but not about its "major" axis. Each half of the modified ellipse, as divided at the common "major" axis appears like a semi-ellipse, that is, there are osculating ellipsoids of revolution which appear to match the revolute surfaces having the meridian section of part of the oblate oval modified ellipse, over a large area about the axis of revolution.

Figure 6:
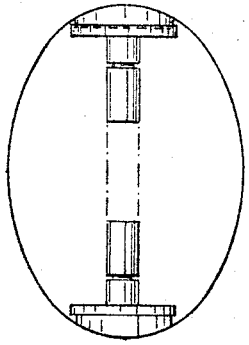
FIG. 6 is a view of the principal section of a work blank ground to the profile of a prolate ellipsoid.

For $r \sec \phi > d > 0$, the trace of the generating circle in the principal section has the appearance of a semi-oblate ellipse joined smoothly to a curved section of a trace having a point of inflection (FIG. 6). Depending upon whether the surface to be generated faces up or down, revolutes with profiles of either of the portions of the traces can be generated. At $d=0$, the two portions of the trace of the generating circle, just described, merge into an arc of a circle. The revolute generated when $d=0$ is a sphere of radius $r$.

The profile of modified ellipsoids can be mathematically described in several ways. For example, the coordinates for points along the profile can be listed in tabular form, or the data may be presented graphically, or the profile can be expressed as an algebraic or transcendental function.

Although the concept of eccentricity applies only to conics and conicoids of revolution, it can be usefully employed to describe approximately the shape of modified ellipsoids, which closely resemble conicoids, at and about their apices.

The eccentricity of a conic section can be expressed as a differential equation, $e = df/dx$, where $f$ is the focal radius of the conic section, and $x$ is the coordinate along the major axis of the conic with the apex of the conic as the origin. In conic sections, eccentricity is a constant, whereas in modified ellipsoids, expressed in terms of eccentricity, eccentricity is not a constant but varies continuously as a function of $x$.

In order to give a more exact description of the extended meridian profile of modified ellipsoids, eccentricity may be expressed in the form of a Taylor series. Using MacLaurin's formula, the eccentricity of a modified ellipsoid can be written as:

$$e_g = df/dx + (d^2f/dx^2)x + \frac{(d^3f/dx^3)x^2}{2!} + \frac{(d^4f/dx^4)x^3}{3!} \cdots \quad (3)$$

where $e_g$ given by (3) is defined as the generalized or effective eccentricity.

It is sufficient, however, for the purpose of description of this invention, to define the modified ellipsoid in terms of the focus and eccentricity of the osculating conicoid of revolution.

Consider a modified prolate hemi-ellipsoid. The eccentricity and focus of the osculating conicoid can be determined by selecting a pair of points, $P_1(a_1, b_1)$, $P_2(a_2, b_2)$, near the prolate point of the modified ellipsoid and applying their coordinates to the following equation:

$$e = \left(1 + \frac{a_2 b_1^2 - a_1 b_2^2}{a_1 a_2 (a_1 - a_2)}\right)^{1/2} \quad (4)$$

where $a_1$ and $a_2$ are the coordinates in the direction of the major axis, and $b_1$ and $b_2$ are the corresponding coordinates in the direction of the minor axis, the origin being the prolate point.

The focus of the osculating conicoid is given by the following equation:

$$f = \frac{b_1^2 - a_1^2(e^2 - 1)}{2a_1(e + L_0)} \quad (5)$$

Several examples of modified prolate ellipsoids and their osculating conicoids of revolution will now be given.

Table 1

| a (cm.) | b (cm.) osculating ellipsoid | b (cm.) modified ellipsoid | Δb (cm.) |
|---|---|---|---|
| 0.0800 | 0.9975 | 0.9975 | 0.0000 |
| 0.1601 | 1.4071 | 1.4071 | 0.0000 |
| 0.2403 | 1.7190 | 1.7190 | 0.0000 |
| 0.3205 | 1.9799 | 1.9799 | 0.0000 |
| 0.4007 | 2.2079 | 2.2079 | 0.0000 |
| 0.4810 | 2.4124 | 2.4125 | 0.0001 |
| 0.5614 | 2.5989 | 2.5990 | 0.0001 |
| 0.6418 | 2.7711 | 2.7713 | 0.0002 |
| 0.7223 | 2.9315 | 2.9317 | 0.0002 |
| 0.8029 | 3.0819 | 3.0822 | 0.0003 |

Figure 17:
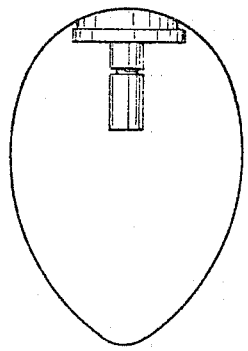
FIG. 17 shows a trace in the principal or meridian section of a modified hemi-prolate ellipsoid with the generated surface facing upward.

Table 1 presents data on a meridian section of a modified hemi-prolate ellipsoid with the generated surface facing upward (FIG. 17) produced with the following adjustments of the variables:

$r = 10$ cm.
$d = 15$ cm.
$\phi = 45°$
$\alpha = 90°$
$s = 0$

By Equations 4 and 5, the eccentricity and focus of the osculating ellipsoid are 0.4065 and 4.4436 cm. respectively. A comparison of coordinates, in Table 1, for points along a meridian section of the hemi-modified prolate ellipsoid and the osculating ellipsoid reveals very small differences in the $b$ coordinates of each for the same $a$ value, for a lens surface of more than 60 mm. in diameter.

Table 2

| a (cm.) | b (cm.) modified ellipsoid | b (cm.) parabola | Δb (cm.) |
|---|---|---|---|
| 0.1456 | 0.9975 | 0.9975 | 0.0000 |
| 0.2898 | 1.4071 | 1.4071 | 0.0000 |
| 0.4326 | 1.7190 | 1.7189 | 0.0001 |
| 0.5740 | 1.9799 | 1.9803 | 0.0004 |
| 0.7141 | 2.2079 | 2.2088 | 0.0008 |
| 0.8529 | 2.4125 | 2.4140 | 0.0015 |
| 0.9905 | 2.5990 | 2.6015 | 0.0024 |
| 1.1270 | 2.7712 | 2.7749 | 0.0036 |
| 1.2623 | 2.9317 | 2.9368 | 0.0050 |
| 1.3966 | 3.0822 | 3.0890 | 0.0068 |

Figure 18:
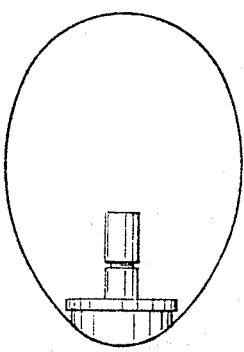
FIG. 18 shows a trace in the principal or meridian section of a modified prolate ellipsoid with the generated surface facing downward.

Table 2 presents data on a meridian section of a modified prolate ellipsoid with the generated surface facing downward (FIG. 18) produced with the following adjustment of the variables:

$r = 10$ cm.
$d = 20.7800$ cm.
$\phi = 45°$
$\alpha = 90°$
$s = 0$

By Equations 4 and 5, the eccentricity and focus of the osculating conicoid are 1.0000 and 1.7081 cm. respectively. Comparison of coordinates in Table 2, for points along a meridian section of the modified prolate ellipsoid and the osculating parabola reveals very small differences in the $b$ coordinates for each, for the same $a$ value, for a lens of more than 60 mm. in diameter.

Table 3

| a (cm.) | b (cm.) osculating hyperboloid | b (cm.) modified ellipsoid | Δb (cm.) |
| --- | --- | --- | --- |
| 0.1966 | 0.9975 | 0.9975 | 0.0000 |
| 0.3870 | 1.4071 | 1.4071 | 0.0000 |
| 0.5718 | 1.7194 | 1.7190 | 0.0003 |
| 0.7515 | 1.9811 | 1.9799 | 0.0012 |
| 0.9266 | 2.2106 | 2.2079 | 0.0023 |
| 1.0975 | 2.4172 | 2.4125 | 0.0047 |
| 1.2646 | 2.6065 | 2.5990 | 0.0075 |
| 1.4281 | 2.7822 | 2.7712 | 0.0109 |
| 1.5882 | 2.9467 | 2.9317 | 0.0150 |
| 1.7454 | 3.1020 | 3.0822 | 0.0198 |

Figure 19:
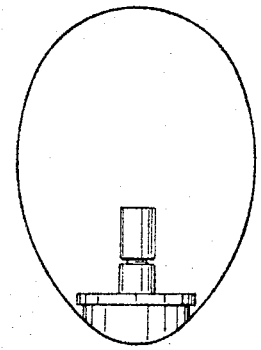
FIG. 19 shows a trace in the principal or meridian section of a modified hemi-prolate ellipsoid with the generated surface facing downward.

Table 3 presents data on a meridian section of a modified hemi-prolate ellipsoid with the generated surface facing downward (FIG. 19), with the following adjustments of the variables:

$r = 10$ cm.
$d = 15$ cm.
$\phi = 45°$
$\alpha = 90°$
$s = 0$

By Equations 4 and 5, the eccentricity and focus of the osculating conicoid are 1.1369 and 1.1705 cm. respectively. A comparison of coordinates in Table 3, for points along a meridian section of the modified hemi-prolate ellipsoid and the osculating hyperboloid reveals very small differences in the $b$ coordinates of each, for the same $a$ value, for a lens surface of more than 60 mm. diameter.

Table 4

| a (cm.) | b (circle) | b (cm.) modified ellipsoid | Δb (cm.) |
| --- | --- | --- | --- |
| 1.0000 | 3.0822 | 3.0822 | 0.0000 |
| 2.0000 | 4.2426 | 4.2426 | 0.0000 |
| 3.0000 | 4.9733 | 4.9733 | 0.0000 |
| 4.0000 | 5.6569 | 4.6569 | 0.0000 |
| 5.0000 | 6.1238 | 6.1238 | 0.0000 |

Table 4 presents data on a meridian section of a revolute produced with the following adjustment of the variables, the work surface facing upward (FIG. 4):

$r = 10$ cm.
$\phi = 45°$
$d = r \cos \phi = 7.0711$ cm.
$\alpha = 90°$
$s = 0$

By Equations 4 and 5, the eccentricity and focus of the revolute produced are 0.0000 and 7.0711. A comparison of coordinates for points along a meridian section of a sphere reveals no different in the $b$ coordinates for the same $a$ values.

These last four examples of revolutes generated by the method of this invention demonstrates that by means of this invention it is possible to produce many modified prolate hemi-ellipsoids very closely approximating conicoids (e.g. ellipsoids, paraboloids, hyperboloids) over a relatively large area about the apex, and including spheres, with a single generating circle. These surfaces so closely approximate conicoids that they may be designated in terms of focus and eccentricity of the osculating conicoid, or in terms of the equivalent apical radius of curvature and of eccentricity, as is done with conicoids. It is possible, however, with a single generating circle of radius $r$, by simultaneously varying $\phi$ and $d$, while $\alpha = 90°$ and $s = 0$, and by generating the optical surface facing either upwards or downwards, to produce revolutes with the same apical radius of curvature and eccentricity, in which departures from a constant eccentricity are significant. Such departures may be desirable in lens or mirror surfaces and this invention includes within its domain, the controlled and systematic departures from true conicoids. As an illustration, consider the modified ellipsoid illustrated in FIG. 13 and Tables 1 and 3. When the generated surface faces upwards, the derivatives of $e$, Equation 3, are positive contribution to the eccentricity, and the osculating conicoid of revolution will lie within the modified ellipsoid. When the generated surface faces downward, the derivatives of $e$ are a negative contribution to the eccentricity and the osculating conicoid of revolution will lie outside of the modified ellipsoid.

Consider now those oval modified oblate hemi-ellipsoids produced when a diameter of the generating circle is parallel to the generator axis, the displacement radius intersecting but not being continuous with a diameter of the generating circle. (In the special case in which a diameter of the generating circle is parallel to the generator axis and the displacement radius is continuous with the diameter of the generating circle, a spherical surface only can generated.)

With a given value of inclination $\phi$, $0° < \phi < 90°$, the surface generated will vary from an oblate ellipsoid when $d = \infty$ (FIG. 5), to a modified oblate ellipsoid when $r \sec \phi < d < \infty$. For $\phi = 0°$ or $90°$, a spherical surface only can be generated for all values of $d$, the radius of curvature of the surface being a function of $\phi$, $d$, and $r$.

The eccentricity and focus of the ellipsoid which osculates the modified oblate ellipsoid about the oblate point is given, in terms of the adjustable variables, by the following equation:

$$e = \frac{\sin \phi}{(1+r^2/d^2)(1+r^2/d^2 \pm (2r/d) \cos \phi)^{1/2}} \quad (6)$$

$$f = a/2^b(1-e)(1-e^2)^{1/2} \quad (7)$$

where $a$ and $b$ are the coordinates of a point on the meridian profile of the modified ellipsoid in the immediate vicinity of the oblate point, the $a$ coordinate being measured from the oblate point in the direction of the "major" axis of the meridian section of the modified ellipsoid, and the $b$ coordinate being measured from the oblate point in the direction of the minor axis, the plus sign in the denominator of Equation 6 being used when the generated surface faces upward and the minus sign being used when the generated surface faces downward.

Table 5

| b (cm.) | a (cm.) modified ellipsoid | a (cm.) ellipsoid | Δa (cm.) |
| --- | --- | --- | --- |
| 0.0862 | 1.4107 | 1.4107 | 0.0000 |
| 0.1724 | 1.9900 | 1.9900 | 0.0000 |
| 0.2884 | 2.4310 | 2.4311 | 0.0001 |
| 0.3444 | 2.8000 | 2.8001 | 0.0001 |
| 0.4303 | 3.1225 | 3.1227 | 0.0002 |

An example of a modified oblate hemi-ellipsoid will now be given. Table 5 presents data on a modified oblate hemi-ellipsoid produced with the following adjustment of the variables, the generated surface facing upwards:

$r = 10$ cm.
$d = 20$ cm.
$\phi = 45°$
$\alpha = 0°$

By Equations 6 and 7, the eccentricity and focus of the osculating conicoid at the oblate point are .4044 and 6.3133, cm. respectively. Comparison of coordinates, in Table 5, for points along a meridian section of the modified oblate hemi-ellipsoid and the osculating ellipsoid reveals very small differences in the $a$ coordinates of each for the same $b$ coordinate, for a lens of more than 60 mm. in diameter, the $b$ coordinate being measured from the oblate point, along the "minor axis" of the modified oblate hemi-ellipsoid, and along the minor axis of the ellipsoid.

This example of the generation of a modified oblate ellipsoid by the method of this invention demonstrates that by means of this invention it is possible to produce many modified oblate ellipsoids very closely approximating oblate ellipsoids, by means of a single generating circle. The modified oblate ellipsoid so closely approximates conicoids at and about their umbilical points that they may be designated in terms of eccentricity, focus, and apical radius of curvature, as is done with conicoids. It is possible, however, with a single generating circle of radius $r$, by simultaneously varying $\phi$ and $d$, while $\alpha=0$, and $s=0$, to produce modified oblate ellipsoids with the same apical radius of curvature and eccentricity in which departures from a constant eccentricity within the usable optical area are significant. Such departures may be desirable in optical surfaces, and this invention includes within its domain, the controlled and systematic departures from true oblate ellipsoidal shape.

In the examples given so far of the generation of revolutes with umbilical points, $s$ was set at zero and $\alpha$ was 90° for the prolate ellipsoid and modified prolate ellipsoids and 0° for the oblate ellipsoids and modified oblate ellipsoids. If $0°<\alpha<90°$, umbilical point revolutes can be generated providing $s$ is adjusted to an appropriate value. The necessary condition for the production of an axial umbilical point is that the work axis shall be perpendicular to the trace of the generating circle in the principal section. Stated in another way, the necessary condition for the production of a revolute with an axial umbilical point is that the evolute of the trace of the generating circle in the principal section be tangent to the work axis.

Figure 21:
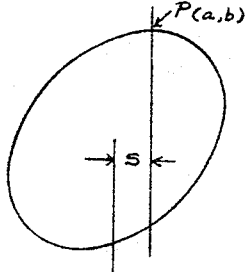
FIG. 21 shows a trace in the principal section of a non-symmetrical ellipsoid generated according to this invention.

Consider an example of a revolute formed with a generating circle of radius $r$, in which $d=\infty$, $0°<\phi<90°$, and $0°<\alpha<90°$. The trace of the generating circle in the principal section is an ellipse with its major and minor axes oblique to the work axis. The value of skewness, $s$, necessary for an apical umbilical point is a function of $r$, $\phi$, and $\alpha$. See FIG. 21.

For any point P $(a, b)$ on the elliptical trace of the generating circle in the principal section, $a$ being the coordinate in the direction of the major axis from the geometrical center of the ellipse as origin, with values ranging from 0 to $r$, and $b$ being the coordinate in the direction of the minor axis with values ranging from 0 to $r \cos \phi$, the value of $s$ necessary for an apical umbilical point there is given by the equation:

$$s = \frac{ab \sin^2 \phi}{(a^2 \cos^4 \phi + b^2)^{1/2}} \quad (8)$$

Figure 22:
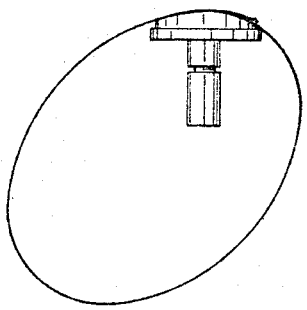
FIG. 22 shows a trace in the principal section generated according to this invention where the azimuth is set between 0° and 90° and the skewness is set to give an umbilical point revolute generated by the leading edge of the tool.
Figure 20:
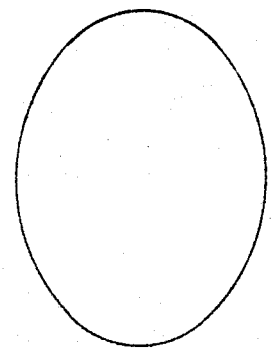
FIG. 20 shows a trace in the principal section of an oblate ellipsoid generated according to this invention.
Figure 23:
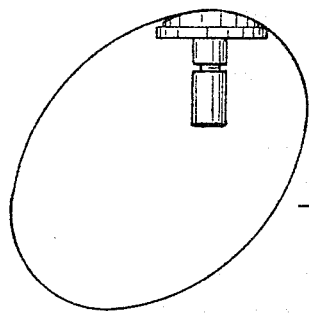
FIG. 23 is like FIG. 22 except that the principal section is generated by the trailing edge of the tool.

In the example just given, the trace of the generating circle in the principal section is a non-symmetrical shape with respect to the work axis. Consequently it is possible to generate two revolutes having the same apical umbilical point with a single set of adjustments of the variables. For example, with the following values for the adjustable variables, $r=10$ cm.
$d=\infty$
$\phi=45°$
$\alpha=45°$
$s=2.8868$ cm.

a decrease in the displacement angle until the center of the generating circle is a distance $b \tan \phi = 4.0825$ cm. from the principal section, results in the generation of an umbilical point revolute corresponding to the trace of the leading edge of the generating circle in the principal section to a point P $(a, b)$ (FIG. 22). The generation of the revolute may be discontinued at this point by reversing the approach of the generating circle. If, instead of reversing the approach of the generating circle, it is continued in its original direction beyond the 4.0825 cms., additional material will be removed from the work piece, and a second revolute (FIG. 23) with an apical umbilical point will be formed, the apical radius of curvature, obtained by Equations 2 ($a$, $b$, and $c$), being the same for both revolutes, and in this example, equal to 7.6980 cms.

The two revolutes differ; the first formed having decreasing curvature of its meridian profile from the apical umbilical point to the minor axis of the trace of the generating circle in the principal section, and then increasing curvature; the second formed having increasing curvature of its meridian profile from the apical umbilical point to the major axis of the trace of the generating circle in the principal section, and then decreasing the curvature. By restricting the diameter of the work piece, the revolute can be limited to having decreasing curvature of a meridian section from the apical umbilical point to the edge of the work piece, resembling the profile of the apical portion of a prolate ellipsoid, or the revolute can be limited to having increasing curvature from the apical umbilical point to the edge of the work piece, resembling the profile of the apical portion of the oblate ellipsoid. The profiles of these revolutes can be determined precisely by calculating the position of points on the elliptical trace of the generating circle in the principal section with respect to the work axis, the axis of symmetry. The apical radius of curvature at the umbilical point can be determined by Equations 2 ($a$, $b$, and $c$). Generalized eccentricity of the revolute can be expressed by a series expansion comparable to Equation 3.

If $d$ is finite, $0°<\phi<90°$, and $0°<\alpha<90°$, the trace of the generating circle in the principal section is non-symmetrical and non-elliptical. The trace of the generating circle in the principal section can be determined precisely by calculating the corresponding position in the principal section of points on the generating circle.

In order that a revolute with an apical umbilical point be generated when $d$ is finite, the vertical work axis must pass through the highest point of the trace of the generating circle in the principal section when the generated surface faces upwards, or the vertical work axis must pass through the lowest point of the trace of the generating circle in the principal section when the generated surface faces downwards. The umbilical point can be located to any desired degree of precision by graphical methods, by successive calculations approaching the maximum point or upper apex of the trace, or the minimum point or lower apex of the trace, or by tabular methods such as the Gregory-Newton formula and its derivative.

Figure 24:
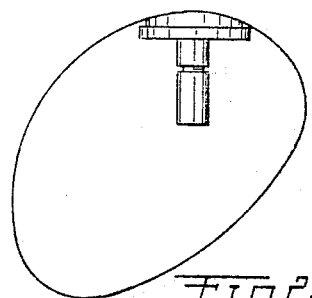
FIG. 24 is an example of a non-symmetrical non-elliptical trace generated in the principal section according to this invention.

An example of a non-symmetrical non-elliptical trace is shown in FIG. 24. It is produced with the following adjustment of the variables:

$r=10$ cm.
$d=15$ cm.
$\phi=45°$
$\alpha=45°$
$s=1.8708$ cm.

With the generated surface facing upwards, as the displacement angle is decreased during the generating process, the profile corresponding to the leading edge of the generating circle is generated on the revolving work piece. When the displacement angle $\gamma$ is reduced to 11.3942°, an umbilical point is generated, and a complete umbilical point revolute is formed. The generation of the revolute may be discontinued at this point by reversing the approach of the generating circle. If instead of reversing the approach of the generating circle it is continued in its original direction, additional material will be removed from the work piece and a second revolute will be formed, the apical radius of curvature being the same for both revolutes, and in this example, equal to 8.7286 cms.

In order to generate revolutes with an apical umbilical point, $s$ must be zero in the case of those revolutes formed when the trace of the generating circle in the principal section is a symmetrical shape, and $s$ must be a finite value when the trace of the generating circle in the principal section is a non-symmetrical shape.

Let $s$ be defined as positive when the trace of the leading edge of the generating circle and the trace of the displacement radius in the principal section are on the same side of the work axis, and let $s$ be defined as negative when the trace of the leading edge of the generating circle and the trace of the displacement radius in the principal section are on opposite sides of the work axis.

In the generation of a cup-shaped revolute which does not and cannot have an apical umbilical point or cusp, there exists a maximum skewness which cannot be exceeded if the cup-shaped revolute is to be generated. Consider as an example the following possible adjustment of the variables:

$d = \infty$ $r = r_{\text{oblate}}(1-e^2)^{\frac{1}{2}}$ where $r_{\text{oblate}}$ is the radius of curvature of the oblate point of the meridian section of the cup-shaped revolute without an apical umbilical point.

Figure 25:
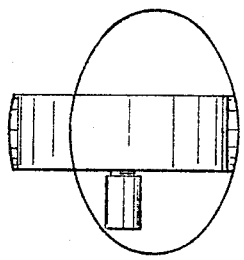
FIGS. 25 and 26 show traces of cup-shaped revolutes generated in the principal section according to this invention and illustrating that the vertical extent of the generated zone is a function of the skewness and of the distance of the center of the generating circle from the principal section.
Figure 26:
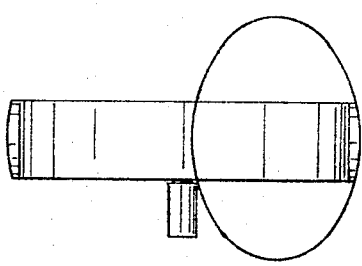

$0° < \phi < 90°$ $\alpha = 90°$ with the above possible adjustments of the variables, the limiting positive value of $s$, defined as $s_M$, such that values of $s > s_M$ do not permit the generation of cup-shaped revolutes, is given by the equation:

$$s_M = r \sin \phi \tan \phi \qquad (9)$$

when $0 < s < r \sin \phi \tan \phi$, a cup-shaped revolute without an apical umbilical point or cusp, having upper and lower boundaries, that is, a zone of revolute surface, will be generated by the leading edge of the generating circle. The vertical extent of the generated zone is a function of $s$ and the distance $x$ of the center of the generating circle from the principal section (see FIGS. 25 and 26).

As the leading edge of the generating circle passes through the principal section, it generates the cup-shaped zone of revolute whose vertical extent, $z$, increases according to the following equation:

$$z = 2r \left(1 - \frac{x^2}{r^2 \sin^2 \phi}\right)^{1/2} \qquad (10)$$

With reduction in $x$, and as $z$ increases, work material is also removed by the following edge of the generating circle at the top and bottom of the zone. Continued reduction in $x$ can result in the middle cup-shaped zone being reduced in vertical extent by the effects of the following edge. The maximum possible vertical extent of $z$ attainable for a given value of $s$, $0 < s < r \sin \phi \tan$, is given by the equation:

$$z = 2r \left(1 - \frac{s^2 \cot^2 \phi}{r^2 \sin^2 \phi}\right)^{1/2} \qquad (11)$$

Continued reduction of the displacement angle results in a revolute being generated by the following edge of the generating circle, the generation of the revolute being completed when the following edge of the generating circle passes through the principal section.

Figure 27:
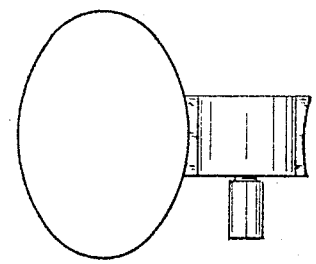
FIGS. 27 and 28 show traces in the principal sections where the skewness is greater than $r \cos \phi$ and the following edge of the tool generates a saddle-shaped revolute without an apical cusp.
Figure 28:
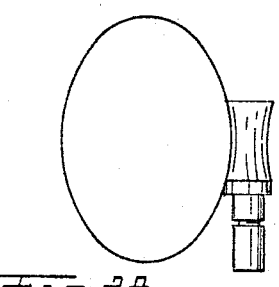
Figure 29:
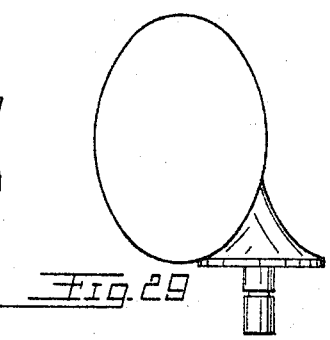
FIG. 29 shows a trace in the principal section generated by the following convex edge of a tool when $0 < s < r \cos \phi$ and shows a saddle-shaped surface with an apical cusp.
Figure 30:
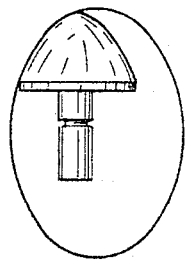
FIGS. 30 and 31 show traces in the principal section of spindle-shaped revolutes generated by the following inner concave edge of a tool when $0 < s < r \cos \phi$.
Figure 31:
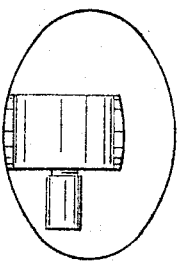

For $s > r \cos \phi$, the following edge of the generating circle will generate a saddle-shaped revolute without an apical cusp (FIGS. 27 and 28). With $0 < s < r \cos \phi$, the following outer convex edge of the generating circle will generate a saddle-shaped surface with an apical cusp (FIG. 29), while the following inner concave edge of the generating circle will generate a spindle-shaped revolute (FIGS. 30 and 3). With $0 > s > -r \cos \phi$, the leading edge of the generating circle will generate a spindle-shaped revolute, and with $s < -r \cos \phi$, the leading edge of the generating circle will generate a saddle-shaped revolute without an apical cusp. The meridian profile of the revolute generated, and therefore one of the principal meridians, is a portion of an ellipse, of positive curvature when the revolute is cup-shaped or spindle-shaped, and of negative curvature when the revolute is saddle-shaped, while the other principal meridian is circular, positive in curvature, and read for cup-shaped revolutes and saddle-shaped revolutes without an apical cusp. For those cup-shaped revolutes, and those saddle-shaped revolutes without an apical cusp, the radius of curvature of the circular meridian is variable and is a function of $s$ and $r \cos \phi$, while the radius of curvature of the elliptical meridian of eccentricity $\sin \phi$, measured at the apex or oblate point of the elliptical profile, is constant, and is given by the equation:

$$r_{\text{oblate}} = \pm \frac{r}{(1-e^2)^{\frac{1}{2}}} \qquad (12)$$

Such surfaces generated on optical material can serve directly as lens surfaces, or can be used as molds for molding or casting lenses. Such surfaces made of metal to which diamond dust has been bonded can serve as line contact generating or grinding tools for the purpose of generating ellipsoids of revolution, the non-cusped saddle-shaped or cup-shaped, revolute rotating about its axis of revolution, or tool axis, and being made to contact the work piece revolving about its axis of revolution, or work axis, the work axis coinciding with the minor axis of the elliptical meridian section of the tool.

Figure 35:
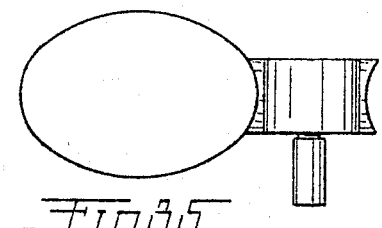
Figure 36:
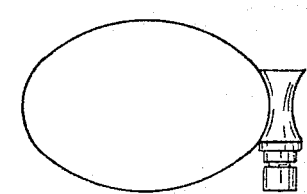
Figure 37:
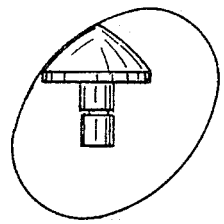
Figure 38:
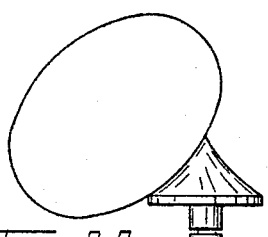
Figure 39:
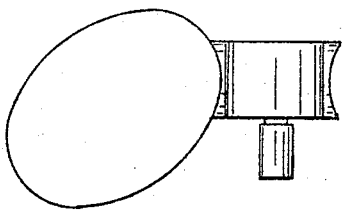

Consider as another example the following possible adjustment of the variables:

$d = \infty$ $r = \dfrac{r_{\text{prolate}}}{1-e^2}$ $0° < \phi < 90°$ $\alpha = 0°$ where $r_{\text{prolate}}$ is the radius of curvature of the prolate point of the meridian section of the revolute now to be described. With the above possible adjustments of the variables, spindle-shaped revolutes will be generated by the concave edge of the generating circle (FIGS. 32 and 33) and saddle-shaped revolute with an apical cusp (FIG. 34) will be generated by the convex edge of the generating circle for all values of $0 < s < r$. For $s > r$, only saddle-shaped revolutes without an apical cusp will be generated (FIGS. 35, 36).

The meridian profile of the revolute generated and therefore one of the principal meridians, is a portion of an ellipse, of positive curvature when the revolute is spindle-shaped and of negative curvature when the revolute is saddle-shaped, while the other principal meridian is circular, positive in curvature, and real for cup-shaped revolutes and saddle-shaped revolutes without an apical cusp. For those cup-shaped revolutes, and those saddle-shaped revolutes without an apical cusp, the radius of curvature of the circular meridian is variable and is a function of $s$ and $r$, while the radius of curvature of the elliptical meridian, of eccentricity $\sin \phi$, measured at the apex, or prolate point, of the elliptical profile, is constant, and is given by the equation:

$$r_{\text{prolate}} = \pm (1-e^2) \qquad (13)$$

The radius of curvature along meridian profiles at points other than the oblate or prolate points can be computed according to Equations 2 ($a, b, c$).

Such surfaces generated on optical material (FIGS. 35 to 39) can serve directly as lens surfaces, or can be used as molds for molding or casting lenses. Such surfaces made of metal to which diamond dust has been bonded can serve as line contact generating or grinding tools for the purpose of generating ellipsoids of revolution, the non-cusped saddle-shaped, or cup-shaped, revolute tool rotating about its axis of revolution, or tool axis, is made to contact the work piece revolving about its axis of revolution, or work axis, the work axis coinciding with the major axis of the elliptical meridian section of the tool.

The profiles of the spindle-shaped surfaces generated by the concave edge of the generating circle with values of $s < r \cos \phi$ when $\alpha = 90°$, and $s < r$ when $\alpha = 0°$, will resemble the profiles of surfaces generated with the same adjustments of the variables but with $s=0$, with the difference that the profiles of the cusped revolutes will, for points along its meridian section corresponding to point along the meridian sections of the umbilical point revolutes, be narrowed by a distance $2s$. The profiles of the saddle-shaped revolutes generated by the convex edge of the generating circle when $s<r \cos \phi$ when $\alpha=90°$, and $s<r$ when $\alpha=0°$, will resemble the profiles of surfaces generated with the same set of adjustments of the variables with the exception that $s=r \cos \phi$ and $s=r$ respectively, but with the difference that the profiles of the cusped revolutes will for points along its meridian section corresponding to points on the meridian section of the revolutes generated when $s=r \cos \phi$ and $s=r$ respectively, be narrowed by a distance $2s$.

Consider now those symmetrical revolutes without an apical umbilical point, formed with a finite value for $d$. Cup-shaped and saddled-shaped revolutes with and without apical cusps, can be generated in a manner similar to that just described. The revolutes differ from those just described in that their meridian profiles consist of portions of the trace of modified ellipses. Consequently, meridian sections of revolutes formed, both cup-shaped and saddle-shaped, will be asymmetric with respect to the sagital principal meridian, where it exists. (Should the sagital principal meridian not exist as in the case where the cup-shaped revolute is entirely on one side of the equator of the revolute, or should the sagital principal meridian be imaginary, as in the case of saddle-shaped revolutes with a cusp, one may still speak of the asymmetry of the revolute with respect to the sagital principal meridian.) The profiles of the symmetric revolutes without apical umbilical points, formed with $d$ finite, can be determined in the same manner as were the profiles of the corresponding revolutes with apical umbilical points, due account being taken of the skewness $s$.

Consider now those revolutes without an apical umbilical point, formed when the trace of the generating circle in the principal section is a non-symmetrical shape with respect to the work axis or any line parallel to the work axis. When $d=\infty$, $0°<\phi<90°$, $0°<\alpha<90°$, for values of $s$ other than those given by Equation 8, spindle-shaped revolutes, cup-shaped revolutes, and saddle-shaped revolutes, with and without apical cusps, can be generated. As a result of the asymmetry of the trace of the generating circle in the principal section, and with the many possible adjustments of the variables, it is possible to generate, for example, a series of revolutes having their meridian profiles utilizing some portion of a particular ellipse. As a specific example, consider an elliptical trace of the generating circle in the principal section of specific size and shape. A particular point $P(a, b)$ intersects the work axis. By simultaneously varying $\alpha$ and $s$, it is possible to maintain point $P(a, b)$ of the elliptical trace on the work axis, while changing the angle between the tangent to point $P(a, b)$ and the work axis (FIG. 40). All the revolutes in this series formed in this manner will contain the same elliptical arc in the meridian profile, but the tangent to point $P(a, b)$ for each member of the series will be inclined differently with respect to the work axis. Since the trace is asymmetric, it is possible to use either the leading edge or the following edge of the elliptical trace in the production of the revolute. In addition, the meridian sections of the revolutes formed by either the leading or the following edge of the generating circle will be asymmetric with respect to the sagital principal meridians, real and imaginary.

A further modification in the motion of the generating circle in the generation of spindle-shaped, cup-shaped, and saddle-shaped revolutes without an apical umbilical point, consists in the adjustment of $d$ to a finite value when $0°<\phi<90$, and $0°<\alpha<90°$. The trace of the generating circle in the principal section is a non-symmetrical shape as shown in FIGS. 41 to 44.

Revolutes generated on optical material when the trace of the generating circle in the principal section, both elliptical and non-elliptical, is non-symmetrical, can serve directly as lens surfaces, or can be used as molds for molding or casting lenses. Such surfaces made of metal to which diamond dust has been bonded can serve as line contact generating or grinding tools. When used as such, the revolute tool revolving about its axis of revolution is made to contact the work piece revolving about its axis of revolution, the work axis coinciding with the normal to the sagital principal meridian of the tool. As a result of the asymmetry of the tool with respect to the sagital principal meridian, the line of contact along a meridian profile of the tool will engage the work piece, the line contact extending along a meridian of the tool from the normal at the sagital principal meridian to the edge of the tool.

The generation, by the leading edge of the generating circle, of surfaces with an apical umbilical point and a point of inflection in the meridian profile requires that $d$ be negative with values ranging from zero to $-r \cos^2 \phi$ when $\alpha=90°$, and $s=0$, and that $0<d<r \sec \phi$, with $\phi$ exceeding $90°$ when $\alpha=0°$, and $s=0$; that is for $\phi$ to exceed $90°$, the leading edge of the generating circle must lie below a plane perpendicular to the displacement radius at the level of the center of the generating circle.

Figure 16:
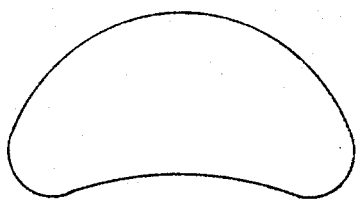
FIG. 16 shows a trace in the principal section generated when $r \sec > d > 0$, and having the appearance of a semi-oblate ellipse joined smoothly to a curved section having a point of inflection.

Consider as an example the revolutes (FIG. 16) formed when $0<d<r \sec \phi$, $90°<\phi<180°$, $\alpha=0°$, and $s=0$. With the work axis vertical and the surface to be generated facing downward, the displacement angle is reduced until the leading edge of the generating circle contacts the work piece as it revolves about the work axis. When $\gamma$ is reduced to $\gamma'$, where $$\gamma' = \sin^{-1}\frac{r \sin \phi}{(r^2+d^2+2rd \cos \phi)^{1/2}} \quad (14)$$

the leading edge of the generating circle intersects the work axis. Reducing the displacement angle to $(\phi-90°)$, the minimum point of the profile is reached at a distance of $(r^2-d^2 \cos^2 \phi)^{1/2}$ from the work axis. The height of the apical umbilical point above the minimum point of the profile is given by the expression:

$$h=(r^2+d^2+2rd \cos \phi)^{1/2} - d \sin \phi \quad (15)$$

The profile of this revolute can be determined precisely by calculating the coordinates of points corresponding to the trace of the generating circle in the principal section.

Consider a second example, the revolute (FIG. 14) formed when $0>d>-r \cos \phi$, $0°<\phi<90°$, $\alpha=90°$, and $s=0$. With the work axis vertical and the surface to be generated facing downward, the displacement angle is reduced until at $$\gamma = \sin^{-1}\frac{r^2 \sin^2 \phi - d^2 \tan^2\phi/\cos^2 \phi^{1/2}}{r^2 \sin^2 \phi - d^2 \tan^2 \phi} \quad (16)$$

the minimum point of the profile is reached at a distance $\cos \phi (r^2-d^2/\sin^4 \phi)^{1/2}$ from the work axis. Reducing the displacement angle to zero, the height $h$ of the umbilical point above the level of the minimum point is given by the expression:

$$h=r+d-(r^2 \sin^2 \;-d^2 \tan^2 \phi)^{1/2} \quad (17)$$

where the sign of $d$ is negative.

The profile of this revolute can be determined precisely by calculating the position of points on its meridian section corresponding to the trace of the generating circle in the principal section.

Surfaces with apical umbilical points and points of inflection in their meridian profiles can be generated with $0°<\alpha<90°$, providing $s$ is adjusted in each case so that the work axis is normal to the apex of the trace of the generating circle in the principal section.

The point of inflection can be located precisely by differentiating twice the equations of the meridian profiles obtained from the coordinates of points along the meridian profiles of the revolutes; for example, equations in the form of a power series, obtained by the Gregory-Newton formula for successive differences.

The apical portions of these surfaces are negative in curvature and non-spherical. By limiting the diameter of these surfaces so that their curvature is all of one sense, they resemble apical portions of conicoids of revolution. These surfaces may be described in terms of generalized eccentricity, or in terms of an algebraic expression in the form of a power series. It is sufficient, however, for the purpose of this invention to define these negatively curved portions of doubly curved surfaces in terms of the osculating conicoid of revolution.

Several examples of negatively curved revolutes will now be given.

Consider the example of a revolute (FIG. 45) formed with the following adjustment of the variables:

$r = 10$ cm.
$d = 8.5$ cm.
$\phi = 135°$
$\alpha = 0$
$s = 0$

By Equations 4 and 5, the eccentricity and focus of the osculating conicoid of revolution of this negatively curved revolute are 1.9211 and 6.1884 cm. respectively.

*Table 6*

| a (cm.) | b (cm.) | b (cm.) hyperboloid | Δb (cm.) |
|---|---|---|---|
| 0.0548 | 1.4107 | 1.4107 | 0.0000 |
| 0.1087 | 1.9900 | 1.9900 | 0.0000 |
| 0.1615 | 2.4310 | 2.4307 | 0.0003 |
| 0.2133 | 2.800 | 2.7988 | 0.0012 |
| 0.2640 | 3.1225 | 3.1198 | 0.0027 |

Table 6 presents data of coordinates for points along a meridian section of this revolute and also for coordinates of the osculating hyperbola. A comparison of coordinates in Table 6 for points along a meridian section of the revolute and the osculating hyperboloid reveals very small differences in the coordinates for an optical surface of more than 60 mm. in diameter.

A second example of a negatively curved revolute (FIG. 46) is one formed with the following adjustment of the variables:

$r = 10$ cm.
$d = 3$ cm.
$\phi = 135°$
$\alpha = 0$
$s = 0$

By Equations 4 and 5, the eccentricity and focus of the osculating conicoid of revolution of this negatively curved revolute are 0.1422 and 9.0671 cm. respectively.

*Table 7*

| a (cm.) | b (cm.) | b (cm.) ellipsoid | Δb (cm.) |
|---|---|---|---|
| 0.0964 | 1.4107 | 1.4107 | 0.0000 |
| 0.1930 | 1.9900 | 1.9900 | 0.0000 |
| 0.2893 | 2.4310 | 2.4310 | 0.0000 |
| 0.3855 | 2.8000 | 2.8000 | 0.0000 |
| 0.4817 | 3.1225 | 3.1225 | 0.0000 |

Table 7 presents data of coordinates for points along a meridian section of this revolute and also for coordinates of the osculating ellipse. A comparison of coordinates in Table 7 for points along a meridian section of the revolute and the osculating ellipsoid reveals very small differences in the coordinates for an optical surface of more than 60 mm. in diameter.

A third example of a negatively curved revolute (FIG. 47) is one formed with the following adjustment of the variables:

$r = 10$ cm.
$d = 6.9999$ cm.
$\phi = 135°$
$\alpha = 0$
$s = 0$

By Equations 4 and 5, the eccentricity and focus of the osculating conicoid of revolution of this negatively curved revolute are 1.0000 and 6.9999 cm. respectively. Table 8 presents data of coordinates for points along a meridian section of this revolute and also for coordinates of the osculating parabola. A comparison of coordinates in Table 8, for points along a meridian section of the revolute and the osculating paraboloid reveals very small differences in the coordinates for an optical surface of more than 60 mm. in diameter.

*Table 8*

| a (cm.) | b (cm.) | b (cm.) paraboloid | Δb (cm.) |
|---|---|---|---|
| 0.0711 | 1.4106 | 1.4106 | 0.0000 |
| 0.1414 | 1.9899 | 1.9899 | 0.0000 |
| 0.2110 | 2.4310 | 2.4308 | 0.0002 |
| 0.2799 | 2.8000 | 2.7995 | 0.0005 |
| 0.3479 | 3.1225 | 3.1214 | 0.0011 |

These examples of negatively curved revolutes generated by the method of this invention demonstrates that by means of this invention it is possible to produce negatively curved revolutes very closely approximating conicoids; e.g., ellipsoids, paraboloids, and hyperboloids, with a single generating circle. These surfaces so closely approximate conicoids of revolution that they may be described in terms of focus and eccentricity of the osculating conicoid of revolution, or in terms of the equivalent apical radius of curvature and eccentricity, as is done with conicoids.

Such surfaces generated on optical material can serve directly as lens or mirror surfaces, or can be used as molds for molding or casting lenses. Such surfaces made of metal to which diamond dust has been bonded can serve as laps for the purpose of generating or grinding surfaces having the opposite profile, the axis of revolution of the tool coinciding with the axis of revolution of the work piece.

Thus far in the description of this invention, the direction of the work axis has been limited to the vertical. Revolutes may be generated with the work axis inclined in any direction. Several examples of revolutes with apical umbilical points, generated with the work axis inclined to the vertical direction, are shown in FIGS. 48, 49 and 50. In these examples, $0 < d < r \sec \phi$, $\phi > 90°$, $\alpha = 0$, and $s = 0$. A special revolute formed with the same adjustment of the variables, with the work axis parallel to the generator axis, is shown in FIG. 51. A plane section of this revolute containing the work axis, has a profile with points of inflection. Such a revolute made of metal to which diamond dust has been bonded, can serve as a line contact generating or grinding tool. When used as such, the tool revolving about its axis of revolution, contacts the work piece revolving about its axis of revolution, the work axis coinciding with the normal to the apex of the meridian profile of the tool, as shown in FIG. 51.

If the variables are adjusted as follows:

$d = \infty$
$r$ = one-half of the maximum slant height of a right circular cone or frustum of a right circular cone
$\phi = 90°$
$0 < \alpha < 90°$ then the trace of the generating circle in the principal section will be a straight line segment of length $2r$, oblique to the work axis by an angle $90 - \alpha$. If $s$ is adjusted so that $0 < x \leqslant r \cos \alpha$, a right circular cone with a maximum slant height of $r+s \sec \alpha$ can be generated. For $s > r \cos \alpha$, a frustum of a right circular cone will be generated, of slant height $2r$, with the diameter of the upper base equal to $s-r \cos \alpha$, and the diameter of the lower base equal to $s+r \cos \alpha$.

As the work piece, facing upward, revolves about the work axis, the displacement angle is gradually reduced until the leading edge of the cup wheel revolving about its axis, contacts the work piece. Further reduction in the displacement angle to the point where $\gamma=0°$, results in the generation of a right circular cone or frustum or a right circular cone, whose slant height varies between 0 and $2r$, with the cone angle $2(90-\alpha)$.

Templates, made of metal or other materials of the customary 16, 18 or 20 gauge brass sheet or steel sheet can be produced with the revolute generator of this invention. The template material is placed so that the principal section lies midway between its two surfaces while the work axis divides the template material into approximately equal halves. The template edge to be generated can face up or down, depending upon whether a convex or concave template is to be produced, or in the case of templates with a point of inflection, whether the paraxial region is to be convex or concave. In those cases in which the trace of the generating circle is a non-symmetrical shape, the curve of the template will be non-symmetrical with respect to any vertical line in the principal section parallel to the work axis. In order to produce symmetrical templates when the trace of the generating circle in the principal section is a non-symmetrical shape, the displacement angle is reduced until the apex of the template is generated, the displacement motion is then reversed to disengage the tool, the template is then manually rotated 180° about the work axis, and the displacement angle is then again reduced until the apex of the template is again reached with the generating circle. Just as it is possible to generate two revolutes with a single adjustment of the variables when the trace of the generating circle is a non-symmetrical shape, it is also possible to produce two templates with a similar single setting of the adjustable variables, depending upon whether the leading or the following edge is to be used to produce the template. Such templates generated on metal or plastic can be used in the conventional manner for matching with revolutes, or such templates made of metal, can be used as cams in generators which employ cams and cam followers.

In order to generate certain revolutes, the prolate ellipsoid being one example, it would be necessary for the displacement angle to be reduced to the extent that the work piece passes partially or completely through the plane of the generating circle. In the case of the prolate ellipsoid, the displacement angle must be reduced at least to the extent that the work axis coincides with the displacement radius.

The actual grinding equipment must be so constructed that the required motions of the machinery will not be limited by the physical dimensions of the parts. In particular, the vertical extent of the work, work holder, and work axis, must not interfere with the movement of the cup wheel through the principal section. As a specific example, consider the generation of a prolate ellipsoid of eccentricity .7071 ($\phi=45°$) having an apical radius of curvature $r_{prolate}$ of 0.05 m. The radius of the generating circle, $r$, is given by the equation $$r=r_{prolate}=10 \text{ cm.}$$

Hence the diameter of the generating circle is 20 cm. and the combined length of the work piece, work holder, and work axis must be less than 20 cm.

The maximum length of the work piece, work holder and work axis which will permit the generation of prolate ellipsoids is thus a function of the eccentricity and radius of curvature of the surface to be generated. For example, if a series of prolate ellipsoids made of ophthalmic glass having an index of refraction of $n=1.5230$ ranging from 0 to 20 diopters, of eccentricity .7071, is to be generated, the total length of the work piece, work holder, and work axis should not exceed 10.46 cm. to permit the generation of the entire series.

In FIGS. 52 through 55 I have shown a machine adapted to generate the various revolutes heretofore described. On a base 60 is fixed a boss or support 61 which has a vertically extending opening 62 through which slidably and snugly moves a vertical column 63. Vertical adjustment of the column is provided by rack 64 on the column cooperating with a pinion 65 meshing therewith and manipulated by hand wheel 66. At the upper end of this column, and at right angles thereto, is mounted a tubular housing 67 in suitable bearings in the column 63 and held in position by bearing cap 68 and bolts 69. At the right-hand end of the housing as shown in FIGS. 52 and 53, a vertical shaft or axle 70 is mounted in suitable bearings and the center of this shaft corresponds to the work axis P shown in FIG. 2 diagrammatically. The upper and lower ends of shaft 70 are threaded for the purpose of attaching a work holder 71 in which is mounted a work blank 72. The work is rotatable by means of a bevel pinion 73 fixed to shaft 70 and meshing with a bevel pinion 74 which is driven by shaft 75 extending through the tubular housing 67 to a driving attachment with an electric motor 76 which has integral therewith a flange 77 bearing against the column 63. The construction is such that motor 76 and housing 67 are rotatable relative to the column 63 and this rotatable adjustment may be held in fixed position, after adjustment, either by the bolt 69 in the bearing cap or by means of a retaining member 78 threaded into the column 63. An indicating finger 79 is secured to the tubular housing 67 and reads against indicia 80 fastened to the cap 68 so as to indicate the angular position of tubular housing 67 and work axle 70 relative to the vertical.

Mounted on the base 60 is means for supporting the cup wheel generator, together with means for rotating the wheel and for moving it, relative to the work. This comprises a longitudinally movable slide 81 which has a downwardly extending projection 82 which is a snug sliding fit in a longitudinally extending slot 83 in the frame 60. The projection 82 has a threaded connection with the longitudinally extending screw 84 having plain bearings at 84a and the screw is rotatable by the hand wheel 85. This serves to move the slide 81 endwise of the base frame 60. A cross slide 86 is suitably mounted on slide 81, for movement at right angles to the movement of slide 81. As best seen in FIG. 54, slide 86 has a downwardly extending projection 87 snugly fitting in slot 88 in slide 81 for the adjustment about to be described. Projection 87 has threaded engagement with a screw 89 which has plain bearings in the slide 81 and at 89a and 89b. Rotation of screw 89 by means of the hand wheel 90 causes movement of the slide 86 crosswise of the slide 81. This is for adjustment of the skewness $s$ previously described. Indicia 91 on the slide 81 traversed by the edge of slide 86 as shown in FIG. 53 permits a reading of the skewness $s$.

Pivotally mounted on the cross slide 86 by means of pivot pin 92 is an upstanding bracket 93 which carries the cup wheel 94 which is used to generate the novel surfaces described in this invention. As seen in FIG. 54, the upper portion 93a of the bracket is adjustably mounted in the lower portion 93 by means of a square extension 93b fitting in a suitable socket in the member 93. Adjustment is provided by means of pin 94a, carried by member 93, fitting into various holes 95 arranged in the projection 39b. An indicator 96 mounted on member 93 reads against indicia 97 on the member 93a and this reads the displacement radius $d$ mentioned heretofore in this description. An arm 98 is pivotally mounted by a vertically extending pin 99 to the bracket member 93a and held in adjusted position by lock nuts 100.

A pointer 101 fixed relative to member 93a reads against indicia 102 carried by bracket 98. As seen in FIG. 54, the arm 98 curves downwardly to the left 90° from the pivot connection 99 and is there provided with a horizontally extending pivot pin connection 103 which is secured to a bracket 104 which in turn carries an electric motor 105 having a drive shaft 106 connected to the cup wheel 94. This adjustment is held by means of nut 107 and the lock washer 108. A pointer 109 carried by bracket 104 reads against indicia 110 carried on arm 98 as best seen in FIG. 52. Setting of azimuth ($\alpha$) and inclination ($\phi$) are made using scales 102 and 110 using well-known mathematical relationships. The adjustments of inclination and azimuth are such that the center of the generating circle $m$ of the cup wheel 94 remains fixed in position, that is, the center of the generating circle is also the center of the adjustments controlling inclination and azimuth just described. The generating circle is formed by the edge 111 of the cup wheel 94 as indicated in FIGS. 52 and 54. The center of this generating circle, marked $m$, is directly in line with the center of pivot pin 92, marked $n$, which is the generator axis referred to previously in this description. In carrying out this invention, the parts may be moved by means of the screw 94 and hand wheel 85 to the dot-dash position of FIG. 52 or up to the indicia marked zero at 112 on FIG. 53. This brings the generator axis $n$ in vertical alignment with the work axis $p$.

Pivotal movement of the bracket 93 about the pivot pin 92 to vary the displacement angle $\gamma$ (indicated therein) is provided by means of a screw 113 which is threaded into a swivel block 114 at one end and another swivel block 115 at the opposite end. Swivel block 114 is pivotally mounted at 116 in a bracket 117 fixed to slide 86. Swivel block 115 is pivotally mounted at 118 in bracket 93. Rotation of screw 113 by means of hand wheel 119 moves the bracket 93 angularly about the pivot pin 92 as indicated by the arrow 120 in FIG. 52.

It should now be apparent how the mechanism may be utilized in carrying out my invention. Those skilled in this art will understand that the edge 111 of the cup wheel 94 is coated with abrasive material in any suitable manner. With the adjustments made as taught hereinabove, and with the slide 81 moved to the mark 112 of FIG. 53, those revolutes utilizing a displacement radius $d$ less than infinity will be carried out by oscillating the bracket 93 about the pivot 92 by means of the hand wheel 119. In some cases, the generating circle will be moved only to the work axis $p$ lying in the principal section of the revolute and then the action will be reversed and the machine withdrawn. In other cases, as indicated in the foregoing description, the generating circle may move until it has traveled past the farthest edge of the work blank 72.

In those forms of my invention calling for a displacement radius of infinity, the bracket 93 is adjusted at right angles to the cross slide 86 by any suitable means and fixed in that position. Then, the generating circle is moved toward the work blank by a longitudinal movement of the slide 81 controlled by the hand wheel 85. It will be understood that this carries all parts of the generating circle in lines perpendicular to the work axis $p$ or to the principal section of the revolute to be formed.

The actual dimensions of the parts of the revolute generator are dependent upon the dimensions of the revolute to be generated. If the revolute ophthalmic lenses are to be generated, cup wheels having generating circle radii between the limits of 5 to 20 cm. will generally suffice. For revolute contact lenses made of methyl methacrylate or other plastic transparent materials, cup wheel generating circles having radii of curvature varying from 1.50 to 3.5 cms. will generally suffice.

An advantage of the revolute generator herein described is that in many cases it permits the simultaneous generation of two optical surfaces (FIG. 6). This is accomplished by attaching a screw thread or taper, work holders and their affixed work pieces, to both ends of the work axle 70. As the generating circle traverses the principal section, both revolutes will be generated in the single traversal. A typical example of the generation of a pair of revolute surfaces, each with an apical umbilical point, is the generation of a pair of identical prolate ellipsoid surfaces, one at each end of the work axle. If the displacement radius is not infinite, a pair of dissimilar modified ellipsoids can be generated, both having apical umbilical points.

Figure 1A:
FIGS. 1A to 1G show diametrically located sectional views through various tools useful in this invention, each tool being circular in plan view.
Figure 1B:
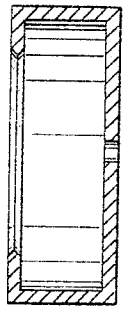
Figure 1C:
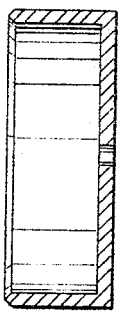
Figure 1D:
Figure 1E:
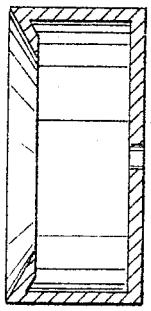
Figure 1F:
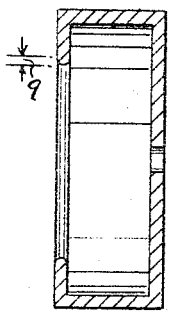
Figure 1G:
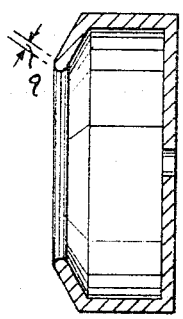

Up to this point, the invention has been described in terms of revolutes produced by a cup wheel having the grinding edge reduced to a pure generating circle. In actual practice, the generating edge of the cup wheel cannot be reduced to a line and generally is a torus of relatively small cross section with respect to the radius of the cup wheel as illustrated in FIGS. 1F and 1G.

The effect of increasing the radius of the toric cup wheel edge in the generation of a revolute is first of all an improvement in the quality of the surface generated. The effect of mechanical vibration would be to extend the point or points of contact between the work piece and the toric cup wheel edge into a broad surface of contact rather than a line of contact, the extent of the area of contact being proportional to the cross sectional radius of the toric edge of the cup wheel, so that a broader toric edge will produce a smoother surface than a narrower toric edge.

A second effect is the distribution of wear over an area of the toric edge of the cup wheel rather than in a line. In the generation of a revolute with a cup wheel having a toric edge, each small change in the displacement angle results in a "new" generating circle located on the surface of the toric cup wheel edge. The net effect of using a toric edge on the cup wheel is a closed generating line, a twisted curve, located on the surface of the toric edge, which is neither circular, nor in a plane. The toric cup wheel edge, or other cross-sectional shapes of the edge of the cup wheel, is an additional degree of freedom which is utilized in the generation of revolutes. One obvious result of using a toric cup wheel edge is the ability to produce non-elliptical revolutes when $\alpha=0°$ or $90°$, with a linear motion of the cup wheel, normal to and through the principal section, that is, with an infinite displacement radius.

The radius $r$ of a toric edge cup wheel shall be defined as the average radius, which is the distance from the axis of the cup wheel to the line of centers of the toric edge. The radius of the cross-sectional area of the toric edge of the cup wheel shall be given the symbol $q$ (see FIGS. 1F and 1G). A plane through the line of centers of the toric cup wheel edge shall be defined as the plane of the generating circle of centers, corresponding to the plane of the generating circle of the earlier descriptions. The angle between the displacement plane and the plane of the generating circle of centers is called the inclination, $\phi$.

The revolutes produced with a toric edge cup wheel shall be named toro revolutes, to distinguish them from those revolutes produced with the cup wheel edge reduced to a circular line.

Consider as an example the toro revolute with the generated surface facing upwards produced with the following adjustment of the variables:

$d=\infty$
$s=0$
$\alpha=90°$
$0°<\phi<90°$, where $\phi<<90°$ $\dfrac{q}{r}\ll 1$ $r-q=\dfrac{r_{oblate}}{1-e^2}$ where $r_{oblate}$ is the desired apical radius of curvature, and $e$ is the approximate eccentricity.

With the above variables, the approximate eccentricity and apical radius of curvature of the toro revolute can be obtained from the following expression:

$$e \simeq \left[1 - \frac{(r^2+q^2-2rq\cos\phi)\left[\cos\left(\phi + \sin^{-1}\frac{q\sin\phi}{(r^2+q^2-2rq\cos\phi)^{1/2}}\right)\right]^2}{(r-q)^2}\right]^{1/2} \quad (18)$$

$$r_{oblate} \simeq (r-q)(1-e^2) \quad (19)$$

If, in the above example, $q$ is relatively large compared to $r$, and $\phi$ is relatively large, the toro revolute will be substantially different from an ellipsoid, and the shape of the profile and the apical radius of curvature can be described in terms of generalized eccentricity or other appropriate expressions.

The revolute generator can also be used to generate elliptical cylinders. The work piece, consisting of optical material or metal, of appropriate dimensions, is held fixed in position at the approximate level of the generating circle with the eventual cylinder axis parallel to frame 60 in FIG. 52; it does not rotate about the work axis. The displacement radius is set at infinity so that the motion of the cup wheel is linear and normal to the principal section plane. The cup wheel is adjusted at the proper angle to project the generating circle as an ellipse against a vertical surface in the position of the principal section in FIG. 2. As the displacement angle is reduced, the elliptical shape of the trace of the generating circle in the principal section is impressed upon the work piece along the direction of motion of the generating circle. Both convex and concave elliptical cylinders can be generated, depending upon whether the concave or convex edge of the generating circle is used for the generation.

Elliptical cylinders generated on optical material may serve directly as lens surfaces, or can be used for molding or casting lenses. Elliptical cylinders made of metal may also be used as molds, for molding or casting lenses of optical material. Elliptical cylinders may also serve as cams for use in cam-following generators.

FIGS. 56, 57 and 58 show another mechanism adapted to generate the various revolutes heretofore described. For holding the workpiece, a base 60' is provided with a boss or support 61' which has a vertically extending opening through which slidably and snugly moves a vertical column 63'. Vertical adjustment of the column is provided by rack 64' on the column cooperating with a pinion 65' meshing therewith and manipulated by hand wheel 66'. The vertical position of the column is indicated by indicia at 62'. Near the upper end of this column, and at right angles thereto, are mounted parts which are in all respects like those previously described for holding upper and lower work holders 71 with a rotating drive shaft 70 for the work holders driven by means of bevel gears 73 and 74, shaft 75 and electric motor 76 fastened on the vertical column 63, all as clearly shown in FIG. 52. Without repeating the description here, all of these parts have been given the same reference numbers as in FIG. 52, but with a prime suffix. The motor 76' and housing 67' are rotatable relative to the column 63' about the shaft 75' as an axis so as to change the angle of the work drive shaft 70' relative to the vertical. This angular adjustment is held by the retaining member 78' and indicated by the finger 79' which is secured to the tubular housing 67' and reads against indicia on the cap 68' of the column 63'.

To get more freedom of movement, the base 60' for supporting the cup wheel generator is mounted to one side of the base 60' and rigidly secured thereto by a plurality of rigidly attached braces 121. In this form of the invention, a longitudinally movable slide 81' is slidably movable relative to the base 60'' and manipulated by a screw 84' rotatable by the hand wheel 85' as described in connection with FIGS. 52 to 55. This serves to move the slide 81' endwise of the base member 60''. A cross slide 86' is slidably mounted on slide 81' for movement at right angles to the movement of slide 81' and adjustable in position by rotation of the screw 89' actuated by the hand wheel 90' as described in the previous mechanism, FIGS. 52 to 55. This is for the adjustment of the skewness $s$ previously described. Indicia 91' on the slide 81' coacts with suitable pointer on the slide 86' as shown in FIG. 56 to permit a reading of the skewness setting.

Pivotally mounted on the cross slide 86' by means of pivot pin 92' is an upstanding bracket 93' which carries the cup wheel 94' in a manner similar to that described in connection with the mechanism of FIGS. 52 through 55 with a difference about to be described. A vertical portion of the bracket 122 carries a rack 123 which coacts with a pinion 124 which is carried by a block 125 rigidly secured to one end of pivot pin 92'. This block has a vertical opening 125a through which the vertical member 122 of the bracket snugly and slidably extends. Hand wheel 126 rotates pinion 124 so as to move the rack 123 up and down. The vertical position of the rack is held by a set screw 127. The vertical position of the cup wheel 94' may be read on the scale 128' on the vertical member 122.

Angular adjustment of the bracket 93' and its vertical member 122 is adjusted relative to the base members 60' and 60'' by means of a bevel gear 129 fixed on pivot pin 92' and meshing with another bevel gear 129 which is rotatably mounted in a bracket 130 which is rigidly fixed to the slide 86'. Gear 129 is rotated by the hand wheel 131 and the desired position of the parts is fixed by means of a set screw 132 passing through the bracket 130. The angular position of the member 122 with respect to the vertical is read by means of a pointer 133 which reads against indicia 134 carried by the bracket 130.

The mounting of the generating cup wheel 94' in the supporting bracket 93' is almost identical with that of cup wheel 94 in bracket 93 described in connection with FIGS. 52 to 55. The chief difference is that the form here described gives greater freedom of movement. Here an arm 98' is pivotally mounted by a vertically extending pin 99' to the bracket 93' and held in adjusted position by lock nuts 100'. A pointer 101' reads against indicia on the surface 102' so as to read the angular adjustment of the arm 98' around the pivot 99'. 360° adjustment is possible here. As viewed in FIG. 57, arm 98' bends outwardly and downwardly to support a horizontally extending pivot pin 103' which is rigid with a bracket 104' which in turn supports the electric motor 105' having its drive shaft 106' connected to the cup wheel 94'. As here illustrated, the cup wheel has the cross section illustrated in FIGS. 1D or 1G. The angular adjustment of the bracket 104' with respect to the arm 98' is read by a pointer 109' reading against indicia 110'. Here again, 360° of adjustment has been provided. The axes of pivot points 99' and 103' both pass through the center 135 of the generating circle of the cup wheel 94'. The point 135 would correspond to the center of the generating circle $m$ referred to in the theoretical discussions hereinabove. The scales 102' and 110' are used for the setting of the azimuth and inclination defined in the theoretical discussions in the specification.

Referring to FIG. 57, it will be noted that the generating cup wheel 94' has a possible movement between an uppermost position indicated in dot-dash lines or a lowermost position indicated in dot-dot-dash lines. Also, the generating circle may be placed at right angles to its full line position as indicated by dotted line position in FIG. 57. Referring to FIG. 58, the vertical member 122 carrying bracket 93' and 98' may be oscillated through an angle of 90° if desired, as indicated by the arrows of FIG. 58. By manipulation of the column 63' the work blanks 72' may be positioned in uppermost and lowermost positions indicated respectively by dot-dash lines and dot-dot-dash lines in FIG. 57 corresponding to the uppermost and lowermost positions of the cup wheel working on such blanks. Referring to FIG. 56, slide 81' may be adjusted to the dot-dash position which will cause the generator axis, the central axis of pivot 92', to lie in the same vertical plane as the work axis which is the central axis of the shaft 70', these two axes defining a plane which I have termed the principal section of the lens generated. As there indicated, other relationships of the work axis and the generator axis are possible also.

The mechanism of FIGS. 56 through 58 is utilized in carrying out this invention similar to the mechanism previously described. The cup wheel 94' is placed in its desired position by means of the rotations provided by pivot pins 99' and 103' and these positions are locked by means of the nuts 100' and 136. The work blank is positioned in relationship to the cup wheel by the adjustments previously described. The slide 81' is adjusted along the base 60" to place the generator axis or pivot pin 92' in the desired relationship with the work axis, the center of shaft 70'. The desired displacement radius $d$ is adjusted along scale 128. The cup wheel is then caused to engage the work blank 72' either by oscillating the vertical member 122 by hand wheel 131 (or suitable power means could be substituted). Otherwise, if infinite displacement radius $d$ is indicated, then the vertical member 122 is fixed in vertical position and the slide 81' is moved lengthwise of base 60" by the hand wheel 85' to cause the generating cup wheel to engage the work blank.

One advantage of the mechanism described in FIGS. 56, 57 and 58 over that described in FIGS. 52 to 55 is that the displacement radius $d$ may be made less than the generating circle radius $r$. Also, with the last described mechanism, surfaces of negative curvature may be produced over a wide range of displacement radii. It should be understood, a number of operations are described of a cutting or grinding lens action using a cup wheel as shown in FIG. 1B or other inwardly directed curving or abrading edge. These illustrations describe the generating of positively curved surfaces. In such cases, by substituting a wheel as shown in FIG. 1A, this invention may be used to generate negatively curved surfaces.

My apparatus may be used to generate surfaces of revolution having utility as optical lenses and mirrors while using the circular material-removing edge of the tool as a "line contact" generator. Referring to FIG. 2, if the displacement angle is set at zero, thus placing the center $m$ in the same plane as the work axis, then setting the azimuth at 90° and setting the work axis parallel to the generator axis while rotating the work blank and the tool about their respective axes, one may then move the tool along the displacement radius (vertically as viewed in FIG. 2) to cause the tool to engage and shape the work blank. It is obvious that at the beginning of the operation the work blank may be either above or below the tool, after which the tool is moved in the proper direction to engage the work blank.

In another manner of using my apparatus as a line contact generator, the displacement angle is again set at zero as previously described, the azimuth is set at zero, the work axis is placed at right angles to the generator axis, and then while rotating the work blank and tool about their respective axes, the tool is moved along or parallel to the generator axis $n$, or in the direction in which skewness is measured, so as to cause the tool to engage and shape the work blank.

What is claimed is:

1. A machine for generating optical surfaces and templates for the same comprising a base, means for mounting a work blank above said base, a tool having a circular grinding edge, means for mounting said tool on said base for movement toward and away from said blank, said last named mounting means providing adjustments of said tool to vary the angle of the plane of said grinding edge relative to said work blank about two diameters of said circle at 90° to each other, means for rotating said tool about an axis normal to the center of said circular grinding edge, and means for causing said tool grinding edge to engage and form said work blank.

2. A machine as defined in claim 1 including means for rotating said work blank about an axis lying in the principal section of the lens generated.

3. A machine as defined in claim 2 including a pivotal connection between said tool mounting means and said base on an axis in the plane of said principal section and in a plane including the center of said circular grinding edge.

4. A machine as defined in claim 3 including means for moving said last-named axis in a plane at right angles to said principal section.

5. A machine as defined in claim 1, wherein said means for mounting said tool on said base includes a slide movable along said base in a generally horizontal plane and an arm pivotally mounted on said slide and adjustable as to arm length to vary the distance between the center of the tool grinding edge and the axis of said pivotal mounting, and wherein said means for causing said tool grinding edge to engage said blank includes means for fixing said arm and moving said slide on the one hand, and means for fixing said slide to position said pivotal axis in any desired position relative to said work blank and moving said arm about said pivotal axis on the other hand.

6. A machine as defined in claim 5 including means for rotating said work blank about a work axis.

7. A machine as defined in claim 2 including a pivotal connection between said tool mounting means and said base, and said tool mounting means provides adjustment of said tool grinding edge substantially in the plane of said last named pivotal connection.

8. A machine as defined in claim 2 including a pivotal connection between said tool mounting means and said base, and said tool mounting means provides adjustment of said tool grinding edge on either side of a plane containing said last named pivotal connection.

9. A machine as defined in claim 2, wherein said tool mounting means provides adjustments of said tool to vary the angle of the plane of said grinding edge relative to said work blank through an arc of 360° about either of two diameters of said circle at 90° to each other.

References Cited by the Examiner

UNITED STATES PATENTS 2,352,146    6/1944    Desenberg _____ 51—284 X

ROBERT C. RIORDON, *Primary Examiner.*

L. S. SELMAN, *Assistant Examiner.*